United States Patent
Yajima et al.

(10) Patent No.: US 6,701,744 B1
(45) Date of Patent: Mar. 9, 2004

(54) MOTOR-DRIVEN NEEDLE VALVE FOR REFRIGERATING CIRCUIT AND REFRIGERATING DEVICE WITH THE MOTOR-DRIVEN NEEDLE VALVE

(75) Inventors: Ryuzaburo Yajima, Sakai (JP); Nobuo Domyo, Sakai (JP); Hajime Esumi, Sakai (JP); Shigeharu Taira, Kusatsu (JP)

(73) Assignee: Daikin Industries, Ltd. (JP)

( * ) Notice: Subject to any disclaimer, the term of this patent is extended or adjusted under 35 U.S.C. 154(b) by 0 days.

(21) Appl. No.: 09/959,846
(22) PCT Filed: May 12, 2000
(86) PCT No.: PCT/JP00/03042
§ 371 (c)(1),
(2), (4) Date: Nov. 9, 2001
(87) PCT Pub. No.: WO00/70276
PCT Pub. Date: Nov. 23, 2000

(30) Foreign Application Priority Data

May 12, 1999 (JP) .............................. 11/130699

(51) Int. Cl.⁷ .............................. F25B 1/09; F25B 41/06
(52) U.S. Cl. ................................... 62/502; 62/528
(58) Field of Search .................. 62/502, 528; 251/77, 251/129.16

(56) References Cited

U.S. PATENT DOCUMENTS 3,977,608 A * 8/1976 Bullock .................. 239/410
4,784,101 A * 11/1988 Iwanaga et al. ............ 123/446
5,295,656 A 3/1994 Campbell et al.
5,299,776 A * 4/1994 Brinn et al. .................. 251/77

FOREIGN PATENT DOCUMENTS

| JP | 5-19717 | 5/1993 |
| JP | 09-264638 | 10/1997 |
| JP | 10-300282 | 11/1998 |
| JP | 11-108504 | 4/1999 |
| WO | 90005172 | 5/1990 |
| WO | 9627107 | 9/1996 |
| WO | 98029699 | 7/1998 |

* cited by examiner

Primary Examiner—Melvin Jones
(74) Attorney, Agent, or Firm—Nixon Peabody LLP; Donald R. Studebaker

(57) ABSTRACT

Formed in a valve main body (1) is a refrigerant flow path (41) for lowering the amount of flow of a refrigerant which flows into an internal space (30) of a casing (3) from a refrigerant flow path (9) through a needle fit/insert clearance (17) defined between a needle fit/insert aperture (16) and a needle (2) inserted into the needle fit/insert aperture (16). When, with the rise or drop in refrigerant pressure, refrigerant flows through the needle fit/insert clearance (17), adhesion of sludge included in the refrigerant to the wall surface of the needle fit/insert clearance (17) is reduced by a lessened amount of refrigerant flow in the needle fit/insert clearance (17) by the refrigerant flow path (41). This therefore prevents, as far as possible, malfunction of the needle (2) due to sludge adhesion, thereby ensuring proper operation of the needle (2).

26 Claims, 13 Drawing Sheets

MOTOR-DRIVEN NEEDLE VALVE FOR REFRIGERATING CIRCUIT AND REFRIGERATING DEVICE WITH THE MOTOR-DRIVEN NEEDLE VALVE

TECHNICAL FIELD

The present invention relates to an electrically operated needle valve used for controlling the amount of flow of a refrigerant in a refrigerating circuit and to a refrigerating system provided with such an electrically operated needle valve.

BACKGROUND ART

Referring to FIG. 14, there is shown a construction of an electrically operated expansion valve $Z_0$ which is used for controlling the amount of flow of a refrigerant in a refrigerating circuit. A concrete description of the construction of the prior art electrically operated expansion valve $Z_0$ will be made below for providing a description of the present invention which will be set forth later.

In FIG. 14, the electrically operated expansion valve $Z_0$ has a valve main body 1, a needle 2, and a casing 3. The valve main body 1 is formed into a different diameter body including a flow path formation portion 1a of larger diameter which is positioned on the side of one axial end of the valve main body 1, a screw thread formation portion 1c of smaller diameter which is positioned on the side of the other axial end of the valve main body 1, and a shoulder portion 1b of medium diameter which is positioned between the flow path formation portion 1a and the screw thread formation portion 1c. The shoulder portion 1b and the screw thread formation portion 1c are inserted into an internal space 30 of the casing 3 through an opening 33 formed in one end face of the casing 3. And, the valve main body 1 is made integral with the casing 3 with the shoulder portion 1b and the screw thread formation portion 1c inserted in the casing 3.

The flow path formation portion 1a of the valve main body 1 is provided with a refrigerant flow path 9. The refrigerant flow path 9 is composed of a refrigerant introduction portion 11 and a refrigerant withdrawal portion 12, these portions 11 and 12 being approximately orthogonal to each other. Formed at an opening edge of the refrigerant introduction portion 11 is a valve seat portion 15. A refrigerant introduction pipe 13 is connected to the refrigerant introduction portion 11, whereas a refrigerant withdrawal pipe 14 is connected to the refrigerant withdrawal portion 12.

A needle fit/insert aperture 16 having a given diameter is formed in the valve main body 1. The needle fit/insert aperture 16 is so formed as to extend from the refrigerant flow path 9 of the flow path formation portion 1a to an end of the screw thread formation portion 1c. And, one end of the needle fit/insert aperture 16 opens to the refrigerant flow path 9, whereas the other end of the needle fit/insert aperture 16 opens to an end face of the screw thread formation portion 1c.

The needle 2 is slidably inserted into the needle fit/insert aperture 16. Formed at one end of the needle 2 is a valve head portion 20. The needle 2 travels back and forth along its axial direction, thereby increasing and decreasing the area of a passage between the valve head portion 20 and the valve seat portion 15. Because of such increase and decrease in path area, the amount of flow of a refrigerant flowing from the refrigerant introduction pipe 13 to the refrigerant withdrawal pipe 14 is controlled. Further, when the valve head portion 20 seats against the valve seat portion 15, the refrigerant flow path 9 is placed in the fully closed state. As a result, the circulation of the refrigerant is stopped.

The needle 2 is composed of a stepped shaft body including a sliding shaft portion 2a of larger diameter which is positioned on the side of the valve head portion 20 and a supporting shaft portion 2b of smaller diameter. And, the sliding shaft portion 2a is slidably supported by the valve main body 1 and the axial center position of the needle 2 is held. An extremely narrow needle fit/insertion clearance 17 is defined between the inner peripheral surface of the needle fit/insert aperture 16 and the sliding shaft portion 2a of the needle 2. Further, defined between the inner peripheral surface of the needle fit/insert aperture 16 and the supporting shaft portion 2b is an inner peripheral clearance 22 which is of larger clearance size than that of the needle fit/insert clearance 17.

On the other hand, a pressure equalization aperture 18 having a given diameter is formed in the shoulder portion 1b of the valve main body 1 so that the needle fit/insert aperture 16 passing through the axial center portion of the shoulder portion 1b and the lower end of the internal space 30 of the casing 3 communicate to each other. That is, by virtue of the formation of the pressure equalization aperture 18 of given diameter, the needle fit/insert clearance 17 and a first space portion 31 (which will be described later) communicate with each other.

Further, formed on the outer peripheral surface of the screw thread formation portion 1c of the valve main body 1 is an external thread. A rotor portion 10 constituting a part of an electrically operated means X is disposed on the diameterwise outside of the screw thread formation portion 1c. The electrically operated means X axially drives the needle 2 and is composed of a so-called stepping motor. The electrically operated means X has the rotor portion 10 and an electromagnet 5 disposed on the outer peripheral side of the casing 3.

The rotor portion 10 has a screw thread formation member 7 and a spacer 6. The screw thread formation member 7 is formed into a bottomed tubular-like shape. Formed on the inner peripheral surface of a peripheral wall portion 7a of the screw thread formation member 7 is an internal thread which meshes with the external thread of the screw thread formation portion 1c of the valve main body 1. The spacer 6 is formed into a tubular-like shape having collars at both ends thereof. A permanent magnet 4 is positioned on the outer peripheral side of the spacer 6. On the other hand, the peripheral wall portion 7a of the screw thread formation member 7 is force-fit in the inner peripheral side of the spacer 6 and fixed there rigidly.

The rotor portion 10 is inserted from above the screw thread formation portion 1c of the valve main body 1 with the screw thread formation member 7 engaging with the screw thread formation portion 1c so that the rotor portion 10 is attached to the valve main body 1. Accordingly, the rotor portion 10 rotates in correspondence to the amount of energization (pulse value) of the electromagnetic 5 and makes a relative movement in the axial direction of the screw thread formation portion 1c with respect to the screw thread formation portion 1c of the valve main body 1.

The needle 2 is connected to the rotor portion 10 so that the needle 2 is placed in the opened or closed state by the axial movement of the rotor 10. That is, the upper end of the needle 2 passes through an end face portion 7b of the screw thread formation member 7 and projects therefrom upwardly. The projecting end of the needle 2 is provided with a retaining member 34. The retaining member 34 prevents the needle 2 from slipping downwardly from the screw thread formation member 7. Further, a compression spring 35 is positioned between a step portion between the sliding shaft portion 2a and supporting shaft portion 2b of the needle 2 and the lower surface of the end face portion 7b of the screw thread formation member 7. The spring 35 constantly applies pressing force to the needle 2 and to the screw thread formation member 7 in the direction in which the retaining member 34 abuts against the end face portion 7b of the screw thread formation member 7.

Accordingly, in the range up to the time that the valve head portion 20 seats against the valve seat portion 15, the needle 2 travels with the axial movement of the rotor portion 10 for the increase or decrease in passage area. On the other hand, when the valve head portion 20 seats against the valve seat portion 15, further downward movement of the needle 2 is regulated. In this state, the rotor portion 10, while compressing the spring 35, downwardly travels just a given distance. And, the needle 2 is held in the closed valve state by energizing force of the spring 35. In this case, there is defined a given clearance between the retaining member 34 and the end face portion 7b of the screw thread formation member 7 (for example, see FIGS. 9 and 10 about embodiments of the present invention).

In order to adequately hold a magnet effect between the permanent magnet 4 and the electromagnet 5, the gap between the permanent magnet 4 and the inner peripheral surface of the casing 3 should be set extremely small by the rotor portion 10. Such a gap is for example about 0.2 mm. Therefore, the internal space 30 of the casing 3 is zoned by the rotor portion 10 into a first space portion 31 defined below the rotor portion 10 and a second space portion 32 defined above the rotor portion 10. The first and second space portions 31 and 32 communicate to each other through an outer peripheral clearance 21 defined between the outer peripheral surface of the permanent magnet 4 and the inner peripheral surface of the casing 3.

The prior art electrically operated expansion valve $Z_0$ generally has the above-described structure.

When there is a rise in refrigerant pressure on the upstream side of the electrically operated expansion valve $Z_0$ by compressor drive, the electrically operated expansion valve $Z_0$ receives such a refrigerant pressure rise. As a result, there is produced a pressure differential in the inside of the electrically operated expansion valve $Z_0$. Consequently, a part of the refrigerant flows into the internal space 30 of the casing 3 from the refrigerant flow path 9 through the needle fit/insert clearance 17.

That is, a part of the refrigerant flowing into the needle fit/insert clearance 17, after passing through the pressure equalization aperture 18 in communication with the needle fit/insert clearance 17, directly flows into the first space portion 31.

On the other hand, the remaining refrigerant flows upward through the needle fit/insert clearance 17. Further, the remaining refrigerant flows upward through the inner peripheral clearance 22 defined between a portion of the needle 2 located nearer to the other end thereof and the needle fit/insert aperture 16 of the valve main body 1 from the needle fit/insert clearance 17. Thereafter, the refrigerant is reversed and flows downward through an engagement portion clearance 23 defined between the screw thread formation portion 1c of the valve main body 1 and the screw thread formation member 7. Then, the refrigerant finally reaches to the first space portion 31.

These refrigerants, which have flowed into the first space portion 31 from the foregoing different two routes and merged together there, further flow upward through the outer peripheral clearance 21 and flow into the second space portion 32.

Such refrigerant flow into the first and second space portions 31 and 32 of the casing 3 cancels a difference in pressure between both the axial sides of the rotor portion 10. This ensures smooth movement of the rotor portion 10. In this state, the needle 2 moves with the movement of the rotor portion 10, whereby the amount of refrigerant flow is controlled.

On the other hand, when the compressor stops operating and refrigerant pressure on the upstream side of the electrically operated expansion valve $Z_0$ decreases, a refrigerant in the internal space 30 of the casing 3 follows a route opposite to the above and is flowed back to the refrigerant flow path 9.

PROBLEMS THAT THE INVENTION INTENDS TO SOLVE

Incidentally, the temperature of a compressor sliding portion used in a refrigerating system becomes high under severe operating conditions due to metal contact. As a result, refrigerating machine oil and processing oil remaining in the circuit will undergo degradation, thereby giving rise to the generation of sludge of high viscosity. Besides, the sludge has the property of being refrigerant-insoluble or being difficult to be dissolved into a refrigerant, resulting in the generation of sludge which has not been dissolved into a refrigerant and remained separated therefrom. Such sludge thus generated circulates through the refrigerating circuit, together with the refrigerant.

In this case, with the compressor operation start and stop, in the electrically operated expansion valve $Z_0$ refrigerant flows between the refrigerant flow path 9 and the internal space 30. Besides, the refrigerant flows through narrow clearances, namely, the needle fit/insert clearance 17, the engagement portion clearance 23, and the outer peripheral clearance 21. Consequently, sludge is likely to adhere to each of these clearances 17, 23, and 21.

If sludge adheres to the needle fit/insert clearance 17 and accumulates therein, this obstructs the movement of the needle 2, that is, the action of controlling the amount of refrigerant flow. On the other hand, if sludge adheres to the engagement portion clearance 23 and outer peripheral clearance 21 and accumulates thereon, this obstructs the operation of the rotor portion 10. Any of these cases results in undesirable incidents such as compressor abnormal liquid compression and compressor overheating.

Bearing in mind these problems, the present invention was made. Accordingly, an object of the present invention is to propose an electrically operated needle valve for a refrigerating circuit capable of preventing, as far as possible, the adhesion of sludge and a refrigerating system which is equipped with such an electrically operated needle valve.

DISCLOSURE OF THE INVENTION

The present invention employs the following concrete means with a view to providing solutions to the above-described problems.

An electrically operated needle valve for a refrigerating circuit according to a first invention of the present application is composed of a valve main body 1 including a needle fit/insert aperture 16 through which a needle 2 is slidably arranged and a refrigerant flow path 9 which is formed face to face with one end side of the needle fit/insert aperture 16 and whose flow path area is adjusted by the needle 2, and a casing 3 which is attached to the valve main body 1 with the other end side of the needle fit/insert aperture 16 positioned within an internal space 30 thereof and which houses in the internal space 30 at least a part of an electrically operated means X for driving the needle 2. And, the refrigerating circuit electrically operated needle valve of the first invention is characterized in that the valve main body 1 is provided with a refrigerant flow amount lowering means P for lowering the amount of flow of a refrigerant flowing into the internal space 30 from the refrigerant flow path 9 through a needle fit/insert clearance 17 formed between the needle fit/insert aperture 16 and the needle 2 inserted in the needle fit/insert aperture 16.

A second invention of the present application is characterized in that in the refrigerating circuit electrically operated needle valve according to the first invention the refrigerant flow amount lowering means P is a refrigerant flow path 41 which is formed in the valve main body 1 so as to establish, not through the needle fit/insert aperture 16, a communication between the refrigerant flow path 9 and the internal space 30.

A third invention of the present application is characterized in that in the refrigerating circuit electrically operated needle valve according to the first invention the needle fit/insert aperture 16 has a larger diameter aperture portion 16A located nearer to the refrigerant flow path 9 and a smaller diameter aperture portion 16B, located nearer to the electrically operated means X, for slidably supporting the needle 2, a pressure equalization aperture 18 is formed in the larger diameter aperture portion 16A, the pressure equalization aperture 18 being in communication, not through the smaller diameter aperture portion 16B, with the internal space 30, and the larger diameter aperture portion 16A and the pressure equalization aperture 18 together constitute the refrigerant flow amount lowering means P.

A fourth invention of the present application is characterized in that in the refrigerating circuit electrically operated needle valve according to the third invention the larger diameter aperture portion 16A is provided with a needle guide member 42 which, while slidable supporting the needle 2, allows refrigerant circulation in the axial direction of the larger diameter aperture portion 16A.

A fifth invention of the present application is characterized in that in the refrigerating circuit electrically operated needle valve according to the first invention the needle fit/insert aperture 16 has a first smaller diameter aperture portion 16C located nearer to the refrigerant flow path 9, a second smaller diameter aperture portion 16E located nearer to the electrically operated means X, and a larger diameter aperture portion 16D located midway between the first smaller diameter aperture portion 16C and the second smaller diameter aperture portion 16E and having a diameter greater than that of the first smaller diameter aperture portion 16C and an axial length longer than that of the first smaller diameter aperture portion 16C, the needle 2 is slidably supported either by the second smaller diameter aperture portion 16E or by both of the first smaller diameter aperture portion 16C and the second smaller diameter aperture portion 16E, and a pressure equalization aperture 18 is formed in the larger diameter aperture portion 16D, the pressure equalization aperture 18 being in communication, not through the second small diameter aperture portion 16E, with the internal space 30, and the larger diameter aperture portion 16D and the pressure equalization aperture 18 together constitute the refrigerant flow amount lowering means P.

A sixth invention of the present application is characterized in that in the refrigerating circuit, electrically operated needle valve according to the first invention the refrigerant flow amount lowering means P is implemented by a groove 43 (44) formed either in the outer peripheral surface of the needle 2 or in the inner peripheral surface of the needle fit/insert aperture 16.

A seventh invention of the present application is characterized in that in the refrigerating circuit electrically operated needle valve according to the third or fourth invention the valve main body 1 has a base portion 1A including the refrigerant flow path 9 and a secondary portion 1B which is a separated portion from the base portion 1A and the larger diameter aperture portion 16A is formed in the base portion 1A and the smaller diameter aperture portion 16B is formed in the secondary portion 1B.

An eighth invention of the present application is characterized in that in the refrigerating circuit electrically operated needle valve according to the fifth invention the valve main body 1 has a base portion 1A including the refrigerant flow path 9 and a secondary portion 1B which is a separated portion from the base portion 1A and the first smaller diameter aperture portion 16C and the larger diameter aperture portion 16D are formed in the base portion 1A whereas the second smaller diameter aperture portion 16E is formed in the secondary portion 1B.

A ninth invention of the present application is characterized in that in the refrigerating circuit electrically operated needle valve according to any one of the third to fifth inventions the pressure equalization aperture 18 is a round aperture and has an inside diameter of not less than 1.2 mm.

A tenth invention of the present application is characterized in that in the refrigerating circuit electrically operated needle valve according to the ninth invention a plurality of the pressure equalization apertures 18 are formed around the needle fit/insert aperture 16.

An eleventh invention of the present application is characterized in that in the refrigerating circuit electrically operated needle valve according to any one of the first to tenth inventions the clearance distance of the needle fit/insert clearance 17 is so set as to be not less than 0.2 mm.

An electrically operated needle valve for a refrigerating circuit according to a twelfth invention of the present application is composed of a valve main body 1 including a needle fit/insert aperture 16 through which a needle 2 is slidably arranged and a refrigerant flow path 9 which is formed face to face with one end side of the needle fit/insert aperture 16 and whose flow path area is adjusted by the needle 2, and a casing 3 which is attached to the valve main body 1 with the other end side of the needle fit/insert aperture 16 positioned within an internal space 30 thereof and which houses in the internal space 30 at least a part of an electrically operated means X for driving the needle 2, wherein the electrically operated means X is provided with a screw thread portion which engages on the axial outer side of the needle fit/insert aperture 16 and which extends in the axial direction of the needle fit/insert aperture 16 and an engagement clearance 23 thereof communicates with the needle fit/insert aperture 16 on the side of the other end of the needle fit/insert aperture 16. And, the refrigerating circuit electrically operated needle valve of the twelfth invention is characterized in that a refrigerant flow amount lowering means Q for lowering the amount of flow of a refrigerant flowing into the engagement clearance 23 from the refrigerant flow path 9 through the needle fit/insert aperture 16 is provided.

A thirteenth invention of the present application is characterized in that in the refrigerating circuit electrically operated needle valve according to the twelfth invention the refrigerant flow amount lowering means Q is a communicating aperture 45 which is formed fact to face with the other end of the needle fit/insert aperture 16 in the electrically operated means X.

A fourteenth invention of the present application is characterized in that in the refrigerating circuit electrically operated needle valve according to the twelfth invention the refrigerant flow amount lowering means Q is a refrigerant flow path 49 (50), formed in an end of the needle 2 fit and inserted in the needle fit/insert aperture 16, for bringing the needle fit/insert aperture 16 and the internal space 30 into communication with each other when the needle 2 makes, in its axial direction, a relative displacement with respect to the electrically operated means X.

An electrically operated needle valve for a refrigerating circuit according to a fifteenth invention is composed of a valve main body 1 including a needle fit/insert aperture 16 through which a needle 2 is slidably arranged and a refrigerant flow path 9 which is formed face to face with one end side of the needle fit/insert aperture 16 and whose flow path area is adjusted by the needle 2, and a casing 3 which is attached to the valve main body 1 with the other end side of the needle fit/insert aperture 16 positioned within an internal space 30 thereof and which houses in the internal space 30 at least a part of an electrically operated means X for driving the needle 2, wherein an outer peripheral clearance 21 is formed between the outer peripheral surface of the electrically operated means X and the inner peripheral surface of the casing 3. And, the refrigerating circuit electrically operated needle valve of the fifteenth invention is characterized in that a refrigerant flow amount lowering means R for lowering the amount of flow of a refrigerant flowing between a first space portion 31 of the internal space 30 located on one side of the electrically operated means X and a second space portion 32 of the internal space 30 located on the other side of the electrically operated means X through the outer peripheral clearance 21.

A sixteenth invention of the present application is characterized in that in the refrigerating circuit electrically operated needle valve according to the fifteenth invention the refrigerant flow amount lowering means R is a refrigerant flow path 46 which is formed through a peripheral wall area of a permanent magnet 4 of the electrically operated means X so that the refrigerant flow path 46 extends in the axial direction of the permanent magnet 4.

A seventeenth invention of the present application is characterized in that in the refrigerating circuit electrically operated needle valve according to the fifteenth invention the refrigerant flow amount lowering means R is a refrigerant flow path 47 which is formed through a peripheral wall area of a spacer 6, located on the inner peripheral side of a permanent magnet 4 of the electrically operated means X, for holding the permanent magnet 4 so that the refrigerant flow path 47 extends in the axial direction of the permanent magnet 4.

An eighteenth invention of the present application is characterized in that in the refrigerant circuit electrically operated needle valve according to the fifteenth invention the refrigerant flow amount lowering means R is a refrigerant flow path 48 which is formed at an abutting area between a permanent magnet 4 of the electrically operated means X and a spacer 6, located on the inner peripheral side of the permanent magnet 4, for holding the permanent magnet 4.

A nineteenth invention of the present application is characterized in that a refrigerating circuit electrically operated needle valve of any one of the first to eighteenth inventions is employed as an expansion valve.

A twentieth invention of the present application is characterized in that in the refrigerating system according to the nineteenth invention an HFC refrigerant or mixed refrigerant containing HFC, both of the refrigerants being of higher theoretical discharge temperature than that of R22, is used as the refrigerant.

A twenty-first invention of the present application is characterized in that in the refrigerating system according to the nineteenth invention an HFC refrigerant or mixed refrigerant containing HFC, both of the refrigerants being of higher theoretical discharge temperature than that of R12 and R502, is used as the refrigerant.

A twenty-second invention of the present application is characterized in that in the refrigerating system according to the nineteenth invention a single refrigerant of R32 or mixed refrigerant containing R32 is used as the refrigerant.

A twenty-third invention of the present application is characterized in that in the refrigerating system according to the nineteenth invention a synthetic oil is used as a refrigerating machine oil.

A twenty-fourth invention of the present application is characterized in that in the refrigerating system according to the twenty-second invention polyol ester, carbonic ester, polyvinyl ether, alkyne benzene, or polyalkylene glycol is used as a base oil of the synthetic oil.

A twenty-fifth invention of the present application is characterized in that in the refrigerating system of the twentieth or twenty-first invention a synthetic oil containing an extreme pressure additive is used as a refrigerating machine oil.

A twenty-sixth invention of the present application is characterized in that in the refrigerating system according to any one of the nineteenth to twenty-fifth inventions a plurality of utilization-side heat exchangers or heat source-side heat exchangers are provided.

EFFECTS OF THE INVENTION

The inventions of the present application provide the following effects.

The refrigerating circuit electrically operated needle valve according to the first invention includes a valve main body (1) having a needle fit/insert aperture (16) and a refrigerant flow path (9) to which one end of the needle fit/insert aperture (16) opens, a casing (3) attached to the valve main body (1), a needle (2), inserted in the needle fit/insert aperture (16), for adjusting the flow path area of the refrigerant flow path (9), and electrically operated means (X) for driving the needle (2). Further, the valve main body (1) on the other side of the needle fit/insert aperture (16) is positioned in an internal space (30) of the casing (3), while at least a part of the electrically operated means (X) is housed in the internal space (30) of the casing (3). Additionally, the valve main body (1) is provided with refrigerant flow amount lowering means (P) for lowering the amount of flow of a refrigerant flowing into the internal space (30) from the refrigerant flow path (9) through a needle fit/insert clearance (17) formed between the needle fit/insert aperture (16) and the needle (2).

Accordingly, when, with the rise or drop in refrigerant pressure on the upstream side of the electrically operated needle valve, a refrigerant flows through the needle fit/insert clearance 17, the amount of refrigerant flow in the needle fit/insert clearance 17 is lowered by the refrigerant flow amount lowering means P. By such a drop in refrigerant flow amount, the amount of adhesion of sludge included in the refrigerant to the wall surface of the needle fit/insert clearance 17 is reduced, thereby preventing, as far as possible, malfunction of the needle 2 due to sludge adhesion. This ensures that the needle 2 functions properly, and abnormal liquid compression or overheating in the compressor of the refrigerating circuit is forestalled, therefore achieving improved reliability.

In the refrigerating circuit electrically operated needle valve according to the second invention, the refrigerant flow amount lowering means (P) is a refrigerant flow path (41) which is formed in the valve main body (1) so as to establish another communication between the refrigerant flow path (9) and the internal space (30) independently of the needle fit/insert aperture (16).

Accordingly, the refrigerant flows mostly through the refrigerant flow path 41 of smaller path resistance, and the refrigerant flow amount of the needle fit/insert clearance 17 is reduced relatively, whereby, by such reduction, adhesion of sludge to the wall surface of the needle fit/insert clearance 17 can be suppressed. That is, the effect of the first invention can be accomplished without fail by a simple, inexpensive arrangement, i.e., by forming the refrigerant flow path 41.

In the refrigerating circuit electrically operated needle valve of the third invention according to the first invention, the needle fit/insert aperture (16) comprises a larger diameter aperture portion (16A) located nearer to the refrigerant flow path (9) and a smaller diameter aperture portion (16B), located nearer to the electrically operated means (X), for movably supporting the needle (2). Additionally, the refrigerant flow amount lowering means (P) is composed of a pressure equalization aperture (18) which is formed in the valve main body (1) so as to establish another communication between the larger diameter aperture portion (16A) and the internal space (30) independently of the smaller diameter aperture portion (16B), and the larger diameter aperture portion (16A).

In accordance with the refrigerating circuit electrically operated needle valve of the third invention, a region, located nearer to the refrigerant flow path 9 and corresponding to the larger diameter aperture portion 16A, of the needle fit/insert clearance 17 defined between the inner peripheral surface of the needle fit/insert aperture 16 and the outer peripheral surface of the needle 2, has a path area greater than that of a region corresponding to the smaller diameter aperture portion 16B, so that the former region is smaller in path resistance than that of the latter region, and in addition the pressure equalization aperture 18 is formed in the larger diameter aperture portion 16A.

As a result of such arrangement, the refrigerant from the refrigerant flow path 9 mostly flows into the internal space 30 from the region corresponding to the larger diameter aperture portion 16A through the pressure equalization aperture 18, and the amount of flow of a refrigerant flowing through the smaller diameter aperture portion 16B is reduced relatively. As a result, although a corresponding region of the needle fit/insert clearance 17 to the smaller diameter aperture portion 16B is a narrow clearance, the adhesion of sludge to the region is prevented as far as possible. That is, the effect of the first invention can be accomplished without fail by a simple, inexpensive arrangement, i.e., by forming the larger diameter aperture portion 16A and pressure equalization aperture 18.

In the refrigerating circuit electrically operated needle valve of the fourth invention according to the third invention, the larger diameter aperture portion (16A) is provided with a needle guide member (42) which, while movably supporting the needle (2), allows refrigerant circulation in the axial direction of the larger diameter aperture portion (16A).

Accordingly, while ensuring refrigerant circulation through the needle fit/insert clearance 17, the axial center of the needle 2 is held more assuredly by the needle guide member 42. As a result, the effect of the third invention is further speeded up.

In the refrigerating circuit electrically operated needle valve of the fifth invention according to the first invention, the needle fit/insert aperture (16) includes a first smaller diameter aperture portion (16C) located nearer to the refrigerant flow path (9), a second smaller diameter aperture portion (16E) located nearer to the electrically operated means (X), and a larger diameter aperture portion (16D) located between the first smaller diameter aperture portion (16C) and the second smaller diameter aperture portion (16E) and having a diameter greater than that of the first smaller diameter aperture portion (16C) and an axial length longer than that of the first smaller diameter aperture portion (16C). Further, the needle fit/insert aperture (16) is formed so as to movably support the needle (2) either by the second smaller diameter aperture portion (16E) or by both of the first smaller diameter aperture portion (16C) and the second smaller diameter aperture portion (16E). Additionally, the refrigerant flow amount lowering means (P) comprises a pressure equalization aperture (18) which is formed in valve main body (1) so as to establish another communication between the larger diameter aperture portion (16D) and the internal space (30) independently of the second smaller diameter aperture portion (16E), and the larger diameter aperture portion (16D).

In accordance with the refrigerating circuit electrically operated needle valve of the fifth invention, a region, located nearer to the refrigerant flow path 9 and corresponding to the larger diameter aperture portion 16A, of the needle fit/insert clearance 17 defined between the inner peripheral surface of the needle fit/insert aperture 16 and the outer peripheral surface of the needle 2 has a path area greater than that of regions corresponding to the first and second smaller diameter aperture portions 16C and 16E, so that the former region is smaller in path resistance than the latter regions. And, owing to the formation of the pressure equalization aperture 18 in the corresponding region to the larger diameter aperture portion 16A, the refrigerant flowing into the larger diameter aperture portion 16D from the refrigerant flow path 9 through the first smaller diameter aperture portion 16C flows into the internal space 30 from the larger diameter aperture portion 16D mostly through the pressure equalization aperture 18. As a result, the amount of flow of a refrigerant flowing through the second smaller diameter aperture portion 16E is relatively reduced, thereby preventing, as far as possible, the adhesion of sludge to the second smaller diameter aperture portion 16E. Further, although refrigerant flows through the first smaller diameter aperture portion 16C, its length is shorter in comparison with that of the larger diameter aperture portion 16D, so that the amount of sludge adhesion to such a portion is maintained small.

This introduces a synergistic effect which prevents, as far as possible, the operation of the needle 2 from being checked by adhered sludge, thereby ensuring that the needle 2 operates properly. Therefore the effect of the first invention is accomplished without fail.

In the refrigerating circuit electrically operated needle valve of the sixth invention according to the first invention, the refrigerant flow amount lowering means (P) is composed of a groove (43, 44) formed either in the outer peripheral surface of the needle (2) or in the inner peripheral surface of the needle fit/insert aperture (16).

Accordingly, when refrigerant flows through the needle fit/insert clearance 17 defined between the outer peripheral surface of the needle 2 and the inner peripheral surface of the needle fit/insert aperture 16, the refrigerant flows mostly through the groove 43 (44) of smaller path resistance. The refrigerant flow amount in narrow portions other than the groove 43 (44) is relatively reduced, and the adhesion of sludge onto the wall surface of the needle fit/insert clearance 17 is suppressed. That is, the effect of the first invention is achieved without fail by a simple, inexpensive arrangement, i.e., by forming the groove 43 (44).

In the refrigerating circuit electrically operated needle valve of the seventh invention according to the third or fourth invention, the valve main body (1) is composed of a base portion (1A) including the refrigerant flow path (9) and a secondary portion (1B) which is a separated portion from the base portion (1A) whereas the larger diameter aperture portion (16A) is formed in the base portion (1A) and the smaller diameter aperture portion (16B) is formed in the secondary portion (1B).

In the refrigerating circuit electrically operated needle valve of the eighth invention according to the fifth invention, the valve main body (1) comprises a base portion (1A) including the refrigerant flow path (9) and a secondary portion (1B) which is a separated portion from the base portion (1A) and the first smaller diameter aperture portion (16C) and the larger diameter aperture portion (16D) are formed in the base portion (1A) whereas the second smaller diameter aperture portion (16E) is formed in the secondary portion (1B).

In accordance with the refrigerating circuit electrically operated needle valves of the seventh and eighth inventions, in addition to being capable of obtaining the effects of the third to fifth inventions, for example the processing of each aperture portion is easier to carry out in comparison with forming the valve main body 1 in one piece, and it is possible to expect that the cost of manufacturing an electrically operated expansion valve is lowered.

In the refrigerating circuit electrically operated needle valve of the ninth invention according to any one of the third to fifth inventions, the pressure equalization aperture (18) is a round aperture and has an inside diameter of not less than 1.2 mm. Such arrangement ensures that the pressure equalization aperture 18 is nearly prevented from clogging due to sludge adhesion. As a result, the operation of pressure equalization by the pressure equalization aperture 18 is maintained well.

In the refrigerating circuit electrically operated needle valve of the tenth invention according to the ninth invention, a plurality of the pressure equalization apertures (18) are formed around the needle fit/insert aperture (16). Such arrangement further speeds up the operation of pressure equalization on the side of the refrigerating circuit electrically operated needle valve and allows the electrically operated needle valve to quickly shift to proper operation.

In the refrigerating circuit electrically operated needle valve of the eleventh invention according to any one of the first to sixth inventions, the clearance distance of the needle fit/insert clearance (17) is so set as to be not less than 0.2 mm. Such arrangement, while maintaining the action of holding the axial center of the needle 2 by the needle fit/insert aperture 16, makes it possible to effectively reduce the adhesion of sludge to the wall surface of the needle fit/insert clearance 17. This introduces a synergistic effect by which the needle 2 can be kept operating properly over a long period of time.

The refrigerating circuit electrically operated needle valve of the twelfth invention is composed of a valve main body (1) having a needle fit/insert aperture (16) and a refrigerant flow path (9) to which one end of the needle fit/insert aperture (16) opens, a casing (3) attached to the valve main body (1), a needle (2), inserted in the needle fit/insert aperture (16), for adjusting the flow path area of the refrigerant flow path (9), and electrically operated means (X) for driving the needle (2). Further, the valve main body (1) on the other side of the needle fit/insert aperture (16) is positioned in an internal space (30) of the casing (3), while at least a part of the electrically operated means (X) is housed in the internal space (30) of the casing (3). Further, the electrically operated means (X) is provided with a screw thread portion which engages with the valve main body (1) outside the needle fit/insert aperture (16) and extends in the axial direction of the needle fit/insert aperture (16) and an engagement clearance (23) between the screw thread portion of the electrically operated means (X) and the valve main body (1) communicates with one end of the needle fit/insert aperture (16). Additionally, a refrigerant flow amount lowering means (Q) for lowering the amount of flow of a refrigerant flowing into the engagement clearance (23) from the refrigerant flow path (9) through the needle fit/insert aperture (16) is provided.

Accordingly, when, with the rise or drop in refrigerant pressure on the upstream side of the electrically operated needle valve, refrigerant flows toward the engagement clearance 23 through the needle fit/insert clearance 17, the amount of flow of a refrigerant flowing into the engagement clearance 23 is lowered by the refrigerant flow amount lowering means Q. By such a drop in refrigerant flow amount, the amount of adhesion of sludge included in the refrigerant to the wall surface of the engagement clearance 23 is reduced, thereby preventing, as far as possible, malfunction of the screw thread portion due to sludge adhesion. This therefore ensures that the electrically operated means X functions properly, and abnormal liquid compression or overheating in the compressor of the refrigerating circuit is forestalled, therefore achieving improved reliability.

In the refrigerating circuit electrically operated needle valve of the thirteenth invention according to the twelfth invention, the refrigerant flow amount lowering means (Q) is a communicating aperture (45) which is formed fact to face with the other end of the needle fit/insert aperture (16) in the electrically operated means (X). Accordingly, refrigerant flowing into the side of the other end of the needle fit/insert aperture 16 through the needle fit/insert clearance 17 between the needle fit/insert aperture 16 and the needle 2 flows mostly through the communicating aperture 45 which is of smaller path resistance smaller than that of the engagement clearance 23. As a result, there occurs a relative drop in refrigerant flow amount in the engagement clearance 23, thereby reducing the adhesion of sludge to the wall surface of the engagement clearance 23. That is, in accordance with the thirteenth invention the effect of the twelfth invention can be achieved assuredly by a simple, inexpensive structure, i.e., by forming the communicating aperture 45.

In the refrigerating circuit electrically operated needle valve of the fourteenth invention according to the twelfth invention, the refrigerant flow amount lowering means (Q) is a refrigerant flow path (49, 50), formed in an end of the needle (2), for bringing the needle fit/insert aperture (16) and the internal space (30) into communication with each other when the needle (2) makes, in its axial direction, a relative displacement with respect to the electrically operated means (X).

Accordingly, when the needle 2 makes, in its axial direction, a relative displacement with respect to the electrically operated means X, i.e., when the needle 2 is placed in the valve closed state, refrigerant flowing into the side of the other end of the needle fit/insert aperture 16 through the needle fit/insert clearance 17 between the needle fit/insert aperture 16 and the needle 2 flows mostly through the refrigerant flow path 49 (50) which is of smaller path resistance than that of the engagement clearance 23. As a result, there occurs a relative drop in refrigerant flow amount in the engagement clearance 23, thereby reducing the adhesion of sludge to the wall surface of the engagement clearance 23. That is, in accordance with the fourteenth invention the effect of the twelfth invention can be achieved assuredly by a simple, inexpensive structure, i.e., by forming the refrigerant flow path 49 (50).

The refrigerating circuit electrically operated needle valve of the fifteenth invention includes a valve main body (1) having a needle fit/insert aperture (16) and a refrigerant flow path (9) to which one end of the needle fit/insert aperture (16) opens, a casing (3) attached to the valve main body (1), a needle (2), inserted in the needle fit/insert aperture (16), for adjusting the flow path area of the refrigerant flow path (9), and an electrically operated means (X) for driving the needle (2). Further, the valve main body (1) on the other side of the needle fit/insert aperture (16) is positioned in an internal space (30) of the casing (3), while at least a part of the electrically operated means (X) is housed in the internal space (30) of the casing (3). Furthermore, an outer peripheral clearance (21) is formed between the outer peripheral surface of the electrically operated means (X) and the inner peripheral surface of the casing (3). Additionally, a refrigerant flow amount lowering means (R) for lowering the amount of flow of a refrigerant flowing between a first space portion (31) of the internal space (30) located on one side of the electrically operated means (X) and a second space portion (32) of the internal space (30) located on the other side of the electrically operated means (X) through the outer peripheral clearance (21).

Accordingly, when, with the rise or drop in refrigerant pressure on the upstream side of the electrically operated needle valve, refrigerant flows between the first space portion 31 and the second space portion 32 through the outer peripheral clearance 21, the amount of flow of a refrigerant flowing into the outer peripheral clearance 21 is lowered by the refrigerant flow amount lowering means R. By such a drop in refrigerant flow amount, the amount of adhesion of sludge included in the refrigerant to the wall surface of the outer peripheral clearance 21 is reduced, thereby preventing, as far as possible, malfunction of the electrically operated means X due to sludge adhesion. This therefore ensures that the electrically operated means X functions properly, and abnormal liquid compression or overheating in the compressor of the refrigerating circuit is forestalled, therefore achieving improved reliability.

In the refrigerating circuit electrically operated needle valve of the sixteenth invention according to the fifteenth invention, the refrigerant flow amount lowering means (R) is a refrigerant flow path (46) formed in a peripheral wall area of a permanent magnet (4) of the electrically operated means (X).

Accordingly, refrigerant flowing between the first space portion 31 and the second space portion 32 flows mostly through the refrigerant flow path 46 which is of smaller path resistance than that of the outer peripheral clearance 21. As a result, there occurs a relative drop in refrigerant flow amount in the outer peripheral clearance 21, thereby reducing the adhesion of sludge to the wall surface of the outer peripheral clearance 21. That is, in accordance with the sixteenth invention the effect of the fifteenth invention can be achieved assuredly by a simple, inexpensive structure, i.e., by forming the refrigerant flow path 46.

In the refrigerating circuit electrically operated needle valve of the seventeenth invention according to the fifteenth invention, the refrigerant flow amount lowering means (R) is a refrigerant flow path (47) formed in a peripheral wall area of a spacer (6), located on the inner peripheral side of a permanent magnet (4) of the electrically operated means (X), for holding the permanent magnet (4).

Accordingly, refrigerant flowing between the first space portion 31 and the second space portion 32 flows mostly through the refrigerant flow path 47 which is of smaller path resistance than that of the outer peripheral clearance 21. As a result, there occurs a relative drop in refrigerant flow amount in the outer peripheral clearance 21, thereby reducing the adhesion of sludge to the wall surface of the outer peripheral clearance 21. That is, in accordance with the sixteenth invention the effect of the fifteenth invention can be achieved assuredly by a simple, inexpensive structure, i.e., by forming the refrigerant flow path 47.

In the refrigerating circuit electrically operated needle valve of the eighteenth invention according to the fifteenth invention, the refrigerant flow amount lowering means (R) is a refrigerant flow path (48) formed between a permanent magnet (4) of the electrically operated means (X) and a spacer (6), located on the inner peripheral side of the permanent magnet (4), for holding the permanent magnet (4).

Accordingly, refrigerant flowing between the first space portion 31 and the second space portion 32 flows mostly through the refrigerant flow path 48 which is of smaller path resistance than that of the outer peripheral clearance 21. As a result, there occurs a relative drop in refrigerant flow amount in the outer peripheral clearance 21, thereby reducing the adhesion of sludge to the wall surface of the outer peripheral clearance 21. That is, in accordance with the sixteenth invention the effect of the fifteenth invention can be achieved assuredly by a simple, inexpensive structure, i.e., by forming the refrigerant flow path 48.

The refrigerating system of the nineteenth invention employs, as an expansion valve, a refrigerating circuit electrically operated needle valve according to any one of the first to sixth and twelfth to eighteenth inventions.

Accordingly, the electrically operated needle valve has a structure capable of not easily failing to operate properly due to sludge adhesion. Even when the expansion valve is used in such a condition that sludge is relatively likely to be produced, its operation is maintained in a proper condition without malfunction due to sludge adhesion. As a result, the refrigerating system is improved in operation reliability.

In the refrigerating system of the twentieth invention according to the nineteenth invention, an HFC refrigerant or mixed refrigerant containing HFC, both of the refrigerants being of higher theoretical discharge temperature than that of R22, is used as the refrigerant.

In this case, sludge that is generated in the compressor has such a characteristic that the amount of sludge yield increases as the refrigerant discharge temperature goes up. Because of this, if an HFC refrigerant or a mixed refrigerant containing HFC, both of which being of higher theoretical discharge temperature than that of R22, is used as a refrigerant, this results in the increase in sludge yield amount itself. Accordingly, malfunctions due to sludge adhesion are likely to occur in the electrically operated valve.

However, even in such a case, the refrigerating system of this invention employs, as the electrically operated expansion valve, a refrigerating circuit electrically operated needle valve of any one of the first to sixth and twelfth to eighteenth inventions, therefore ensuring that the electrically operated expansion valve operates properly and proper operation of the refrigerating system is realized, although the refrigerant used produces much sludge due to its characteristic of high sludge yield.

In the refrigerating system of the twenty-first invention according to the nineteenth invention, either an HFC refrigerant or mixed refrigerant containing HFC which is of higher theoretical discharge temperature than that of R12 and R502 is used as the refrigerant.

In this case, sludge that is generated in the compressor has such a characteristic that the amount of sludge yield increases as the refrigerant discharge temperature goes up. Because of this, if an HFC refrigerant or a mixed refrigerant containing HFC, both of which being of higher theoretical discharge temperature than that of R12 and R502, is used as a refrigerant, this results in the increase in sludge yield amount itself. Accordingly, malfunctions due to sludge adhesion are likely to occur in the electrically operated valve.

However, even in such a case, the refrigerating system of this invention employs, as the electrically operated expansion valve, a refrigerating circuit electrically operated needle valve of any one of the first to sixth and twelfth to eighteenth inventions, therefore ensuring that the electrically operated expansion valve operates properly and proper operation of the refrigerating system is realized, although the refrigerant used produces much sludge due to its characteristic of high sludge yield.

In the refrigerating system of the twenty-second invention according to the nineteenth invention, a single refrigerant of R32 or mixed refrigerant containing R32 is used as the refrigerant.

In such a case, R32 has several advantages such as low global warming potential and high energy efficiency when used in refrigerating systems because of its high theoretical COP, high heat transfer rate, and low refrigerant pressure loss, but on the other hand R32 has some disadvantages such as high sludge yield because of its higher discharge temperature in comparison with R22 or the like.

However, even when the refrigerating system of this invention uses, as its refrigerant, a single refrigerant of R32 or R32-containing mixed refrigerant, it is possible to ensure proper operation of the electrically operated expansion valve although such a refrigerant produces much sludge, for a refrigerating circuit electrically operated needle valve according to any one of the first to sixth and twelfth to eighteenth inventions is used as the electrically operated expansion valve. This makes it possible to provide refrigerating systems of high global warming prevention effect.

In the refrigerating system of the twenty-third invention according to the nineteenth invention, a synthetic oil is used as a refrigerating machine oil. Further, in the refrigerating system according to the twenty-fourth invention, polyol ester, carbonic ester, polyvinyl ether, alkyne benzene, or polyalkylene glycol is used as a base oil of the synthetic oil.

In such a case, unlike, for example, mineral oil which is used as a refrigerating machine oil in an R22 refrigerating system, the aforesaid synthetic oil is composed of molecules having a molecular weight of narrow range and a nearly single structure. Because of this, the synthetic oil is susceptible to damage when undergoing chemical changes by the influence of moisture, air, impurities, or the like. Besides, such chemical damage results in the increase in sludge yield. Accordingly, in a refrigerating system employing such a synthetic oil as a refrigerating machine oil, the electrically operated expansion valve is likely to fail to operate properly by sludge adhesion.

However, even when the refrigerating system of this invention uses, as its refrigerating machine oil, a synthetic oil such as polyol ester, it is possible to ensure proper operation of the electrically operated expansion valve although such a refrigerating machine oil has a property of high sludge yield, for a refrigerating circuit electrically operated needle valve according to any one of the first to sixth and twelfth to eighteenth inventions is used as the electrically operated expansion valve, thereby making it possible to provide a refrigerating system of high operational reliability.

In the refrigerating system of the twenty-fifth invention according to the twentieth or twenty-first invention, a synthetic oil containing an extreme pressure additive is used as a refrigerating machine oil.

Generally, HFC refrigerant is inferior in self lubricity to HCFC refrigerant, which results in the requirement that an extreme pressure additive be added to refrigerating machine oil. However, such an extreme pressure additive reacts with iron at a high-temperature metallic sliding surface and changes to sludge. Because of this, when an HFC refrigerant is used and in addition a synthetic oil, to which an extreme pressure additive is added, is used as a refrigerating machine oil, the electrically operated expansion valve is liable to fail to operate properly due to sludge adhesion.

However, even when the refrigerating system of this invention uses, as its refrigerating machine oil, a synthetic oil containing an extreme pressure additive, it is possible to ensure proper operation of the electrically operated expansion valve although such a refrigerating machine oil has a property of high sludge yield, for a refrigerating circuit electrically operated needle valve according to any one of the first to sixth and twelfth to eighteenth inventions is used as the electrically operated expansion valve, thereby making it possible to provide a refrigerating system of high operational reliability.

The refrigerating system of the twenty-sixth invention according to any one of the nineteenth to twenty-fifth inventions is provided with a plurality of utilization-side heat exchangers or heat source-side heat exchangers.

In such a refrigerating system including a plurality of heat exchangers, the length of refrigerant piping is longer than for example a refrigerating system having a structure in which utilization-side heat exchangers and heat source-side heat exchangers are connected together on a one-for-one basis. Therefore, moisture, air, and impurities are present in larger amounts in the piping, and the probability that sludge is generated becomes higher because of the inclusion of such contaminant in the refrigerating circuit. Accordingly, in a refrigerating system including a plurality of utilization- or heat source-side heat exchangers, the malfunction of an electrically operated expansion valve is likely to be a problem.

However, even in such a case, a refrigerating circuit electrically operated needle valve having a structure hardly susceptible to sludge adhesion is used as an electrically operated expansion valve, as in the refrigerating system of any one of the nineteenth to twenty-fifth inventions, it is possible to provide a highly reliable refrigerating system free from the malfunction of the electrically operated expansion valve in spite of the structure including a plurality of heat exchangers and therefore having a lengthy piping length.

BEST MODE FOR CARRYING OUT THE INVENTION

Hereinafter, the present invention will be described more specifically based on preferred embodiments thereof.

Figure 14:
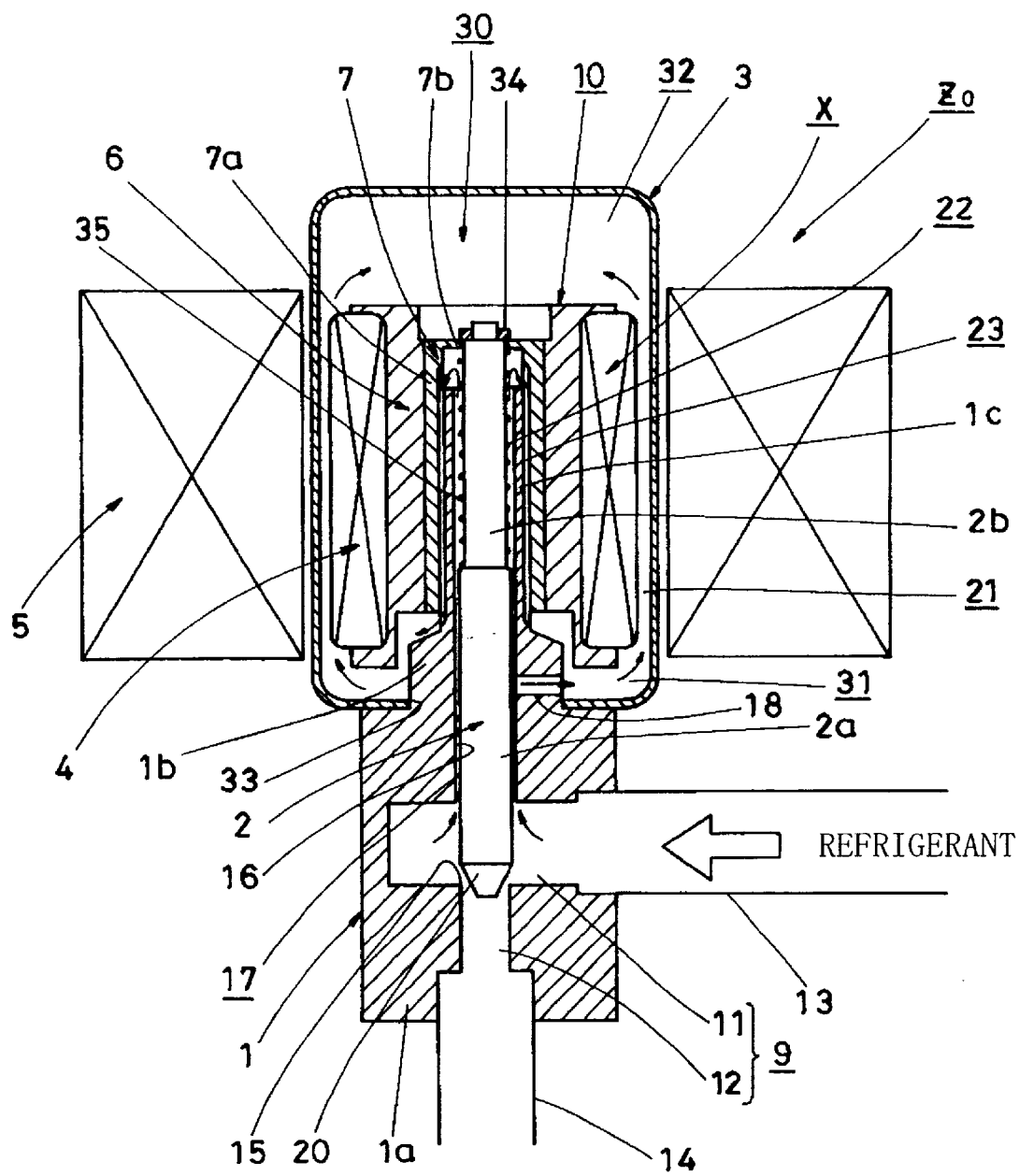
FIG. 14 is a major part cross-sectional view showing the structure of a conventional, typical refrigerating circuit electrically operated expansion valve.

Each of electrically operated expansion valves $Z_1$–$Z_{12}$ as embodiments of the present invention is identical in basic structure with the prior art electrically operated expansion valve $Z_0$ shown in FIG. 14. Accordingly, components of each of the electrically operated expansion valves $Z_1$–$Z_{12}$ corresponding to those described with reference to FIG. 14 showing the electrically operated expansion valve $Z_0$ have been assigned the same reference numerals. In each of the embodiments of the present invention, the description of those corresponding to the components of the electrically operated expansion valve $Z_0$ of FIG. 14 is omitted and only components proper to each embodiment will be described in detail.

EMBODIMENT 1

Figure 1:
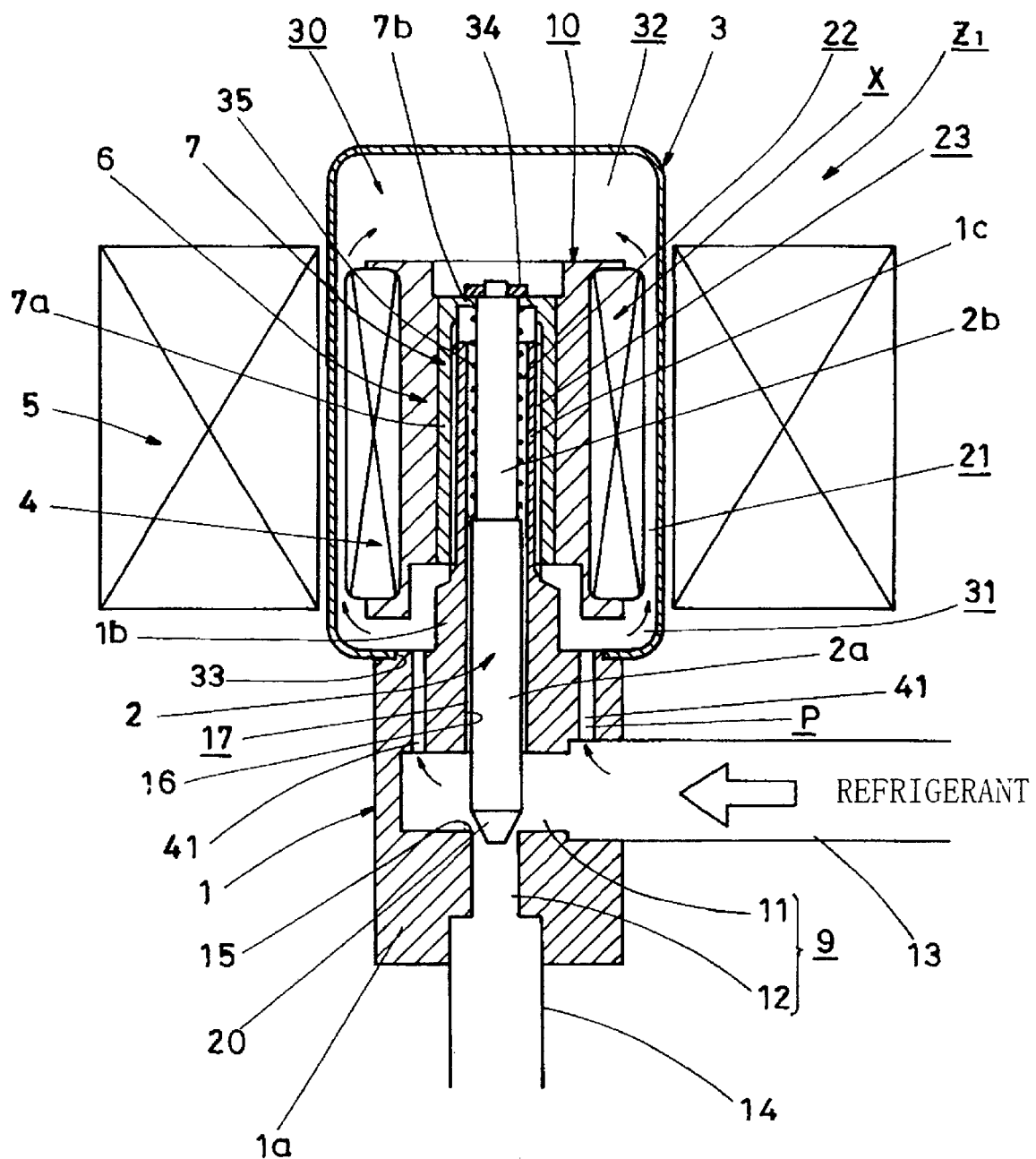
FIG. 1 is a major part cross-sectional view showing the structure of an electrically operated expansion valve as a first embodiment of the refrigerating circuit electrically operated needle valve of the present invention.

Referring to FIG. 1, there is shown an electrically operated expansion valve $Z_1$ of a first embodiment of the present invention. FIG. 1 shows a valve main body 1, a needle 2, a casing 3, a permanent magnet 4, an electromagnet 5, a spacer 6, a screw thread formation member 7, and a rotor portion 10 composed of the permanent magnet 4, the spacer 6, and the screw thread formation member 7. The rotor portion 10 and electromagnet 5 together constitute an electrically operated means X.

The electrically operated expansion valve $Z_1$ of the present embodiment is intended for preventing, as far as possible, sludge adhesion in the wall surface of a narrow needle fit/insert clearance 17 formed between a needle fit/insert aperture 16 formed in the valve main body 1 and the needle 2 which is fit-inserted into the needle fit/insert aperture 16. The electrically operated expansion valve $Z_1$ of the present embodiment is designed to control, as far as possible, the adhesion of sludge to the wall surface of the needle fit/insert clearance 17 by reducing the amount of a refrigerant flowing through the needle fit/insert clearance 17, when, with the rise or drop in refrigerant pressure on the side of the refrigerant flow path 9 accompanied with the operation start and stop of a compressor (not shown), refrigerant flows between the refrigerant flow path 9 and the internal space 30 of the casing 3.

As a concrete means for the above, the first and second inventions of the present application are applied to the electrically operated expansion valve $Z_1$ of the present embodiment, wherein an adequate number of refrigerant flow paths 41 (refrigerant flow amount lowering means P), through which the refrigerant flow path 9 and the first space portion 31 on the side of the casing 3 directly (not through the needle fit/insert clearance 17) communicate to each other, is formed in areas of the flow path formation portion 1a of the valve main body 1.

As a result of such arrangement, when refrigerant flows between the refrigerant flow path 9 and the internal space 30 by a pressure differential between the side of the refrigerant flow path 9 and the side of the internal space 30, the amount of refrigerant flowing through the needle fit/insert clearance 17 is relatively reduced. That is, at the time when the compressor starts operating, refrigerant flows from the side of the refrigerant flow path 9 toward the internal space 30, whereas at the time when the compressor stops operating, refrigerant flows from the side of the internal space 30 toward the refrigerant flow path 9. The path resistance between the needle fit/insert clearance 17 and each refrigerant flow path 41, 41, . . . is very much smaller on the side of each refrigerant flow path 41, 41, . . . than on the side of the needle fit/insert clearance 17. Therefore, most of the refrigerant flows through the refrigerant flow paths 41, 41, . . . , so that the amount of refrigerant flowing through the needle fit/insert clearance 17 is relatively reduced.

As a result, because of such a relative drop in the amount of refrigerant flowing through the needle fit/insert clearance 17, the amount of sludge adhesion to the wall surface of the needle fit/insert clearance 17 is reduced in proportion to the drop in the amount of refrigerant flowing through the needle fit/insert clearance 17 even when employing a refrigerant or refrigerating machine oil of high sludge yield.

Accordingly, the problem that the operation of the needle 2 is checked due to the adhering of high-viscosity sludge to the wall surface of the needle fit/insert clearance 17 is prevented as far as possible, thereby ensuring that the needle 2 operates properly. As a result, for example abnormal liquid compression or overheating in the compressor is forestalled, and the operation reliability of a refrigerating system having the electrically operated expansion valve $Z_1$ is enhanced.

Additionally, since the refrigerant flow path 41 has a large path area, there occurs little sludge adhesion thereto. Further, in the present embodiment each refrigerant flow path 41, 41, . . . is able to function also as the pressure equalization aperture 18 in the electrically operated expansion valve $Z_0$ of conventional construction, and there is provided no pressure equalization aperture 18.

EMBODIMENT 2

Figure 2:
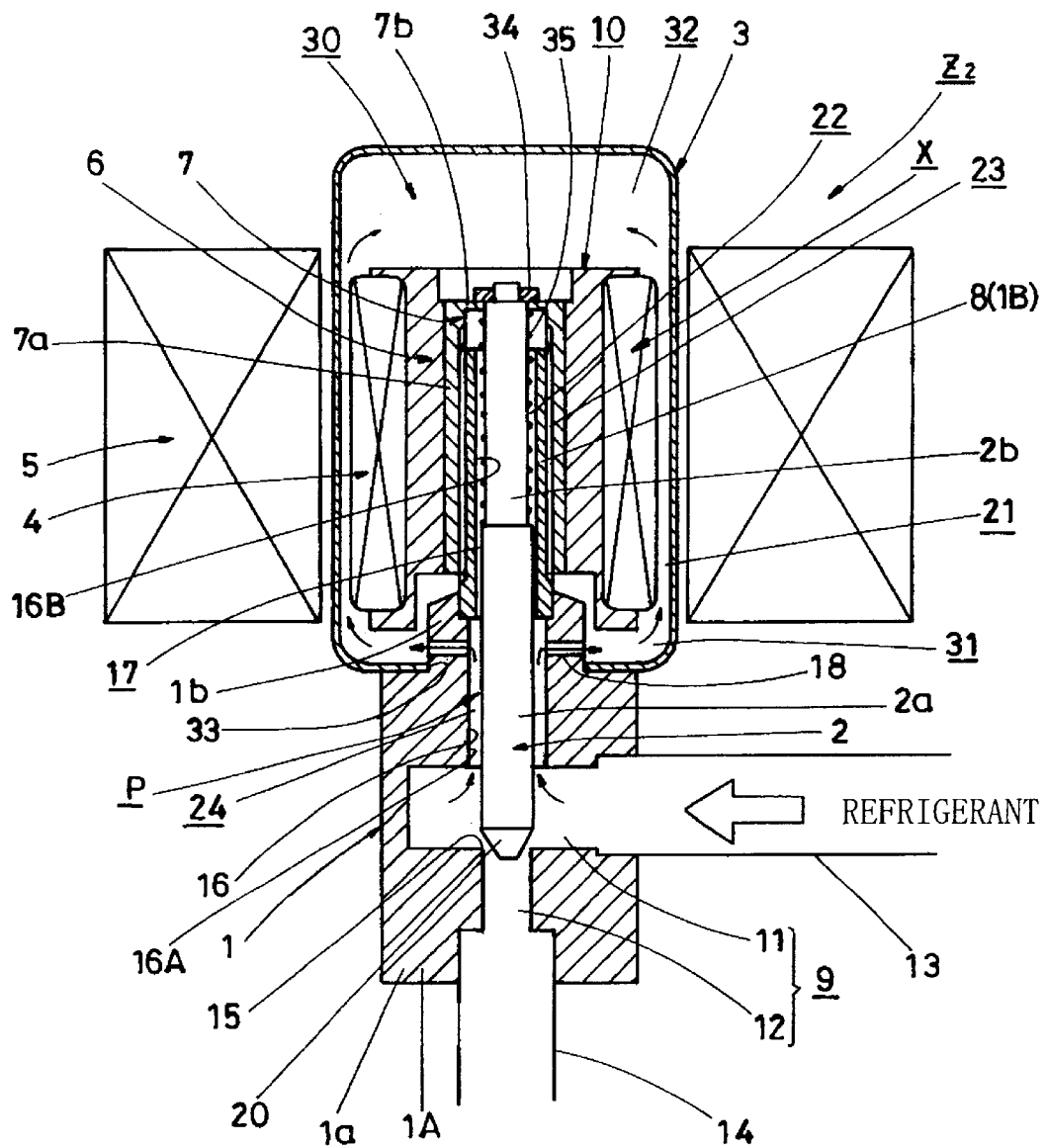
FIG. 2 is a major part cross-sectional view showing the structure of an electrically operated expansion valve as a second embodiment of the refrigerating circuit electrically operated needle valve of the present invention.

Referring now to FIG. 2, there is shown an electrically operated expansion valve $Z_2$ according to a second embodiment of the present invention. The electrically operated expansion valve $Z_2$ is an electrically operated expansion valve to which the first, third, seven, ninth, and tenth inventions of the present application are applied. Like the electrically operated expansion valve $Z_1$ of the first embodiment, the electrically operated expansion valve $Z_2$ has a structure designed for preventing the needle 2 from failing to operate properly due to sludge adhesion to the wall surface of the needle fit/insert clearance 17.

That is, the electrically operated expansion valve $Z_2$ of the present embodiment is characterized by the following structures.

(1) The valve main body 1 is characterized in structure as follows.

In the first embodiment, the valve main body 1 employs an integral structure of the flow path formation portion 1a, the shoulder portion 1b, and the screw thread formation portion 1c. On the other hand, in the present embodiment the valve main body 1 employs a combined structure of a base portion 1A including only the flow path formation portion 1a and the shoulder portion 1b and a secondary portion 1B formed of a screw thread formation member 8 corresponding to the screw thread formation portion 1c.

(2) The needle fit/insert aperture 16, which is formed extending over the base portion 1A and the secondary portion 1B, is characterized as follows.

The needle fit/insert aperture 16 is composed of a larger diameter aperture portion 16A positioned on the side of the base portion 1A and a smaller diameter aperture portion 16B positioned on the side of the secondary portion 1B. The diameter dimension of the smaller diameter aperture portion 16B is set to a value approximate to the outside diameter of the needle 2 in order to slidably support the needle 2, and the clearance between the smaller diameter aperture portion 16B and the outer peripheral surface of the needle 2 is the needle fit/insert clearance 17. On the other hand, the diameter dimension of the larger diameter aperture portion 16A is set greater than that of the smaller diameter aperture portion 16B, and the clearance between the larger diameter aperture portion 16A and the outer peripheral surface of the needle 2 is an annular clearance 24 which is of greater clearance dimension than that of the needle fit/insert clearance 17.

(3) A plurality of the pressure equalization apertures 18 for establishing communication between the annular clearance 24 and the first space portion 31 are formed in the base portion 1A.

The electrically operated expansion valve $Z_2$ of the present embodiment employs the above-described distinctive structures (1)–(3), whereby the following operation effects can be obtained.

First, in the case that refrigerant flows between the refrigerant flow path 9 and the internal space 30 by the difference in pressure therebetween, the path resistance between the needle fit/insert clearance 17 on the side of the secondary portion 1B and the annular clearance 24 on the side of the base portion 1A is very much smaller in the annular clearance 24 than in the needle fit/insert clearance 17. Further, the pressure equalization aperture 18 is formed face to face with the annular clearance 24, so that for example when considering such a case that refrigerant flows from the refrigerant flow path 9 to the internal space 30, the refrigerant, which has flowed into the annular clearance 24 from the refrigerant flow path 9, flows directly into the first space portion 31 through the pressure equalization aperture 18 from the annular clearance 24. Because of this, the refrigerant amount of the needle fit/insert clearance 17 of greater path resistance is relatively reduced.

As a result, because of such a relative drop in the amount of refrigerant flowing through the needle fit/insert clearance 17, the amount of sludge adhesion to the wall surface of the needle fit/insert clearance 17 is reduced in proportion to the drop in the amount of refrigerant flowing through the needle fit/insert clearance 17 even when employing a refrigerant or refrigerating machine oil of high sludge yield. Accordingly, the problem that the operation of the needle 2 is checked due to the adhering of high-viscosity sludge to the wall surface of the needle fit/insert clearance 17 is prevented as far as possible, thereby ensuring that the needle 2 operates properly. Because of this, for example abnormal liquid compression or overheating in the compressor is forestalled, and the operation reliability of a refrigerating system having the electrically operated expansion valve $Z_2$ is enhanced.

Further, in this case the needle 2 is supported by the smaller diameter aperture portion 16B of the needle fit/insert aperture 16 on the side of the screw thread formation member 8 forming the secondary portion 1B. Such arrangement ensures that the axial center of the needle 2 is held assuredly, and the controlling of refrigerant flow amount is carried out by the needle 2 with high reliability.

Further, in the electrically operated expansion valve $Z_2$ of the present embodiment the valve main body 1 is composed of the base portion 1A including the refrigerant flow path 9 and the secondary portion 1B which is a separated portion from the base portion 1A. Because of this, for example in comparison with forming the valve main body 1 in one piece, the processing of each aperture portion is easier to carry out, and it is possible to expect that the cost of manufacturing the electrically operated expansion valve $Z_2$ is lowered.

Further, for example if the pressure equalization aperture 18 is formed of a round aperture and its inside diameter is so set as to be not less than 1.2 mm, this ensures that the pressure equalization aperture 18 is nearly prevented from clogging due to sludge adhesion. As a result, not only the operation of pressure equalization by the pressure equalization aperture 18 is maintained well, but also proper operation of the electrically operated expansion valve $Z_2$ is ensured.

In the electrically operated expansion valve $Z_2$ of the present embodiment, the annular clearance 24 and the pressure equalization aperture 18 together constitute a refrigerant flow amount lowering means P.

EMBODIMENT 3

Figure 3:
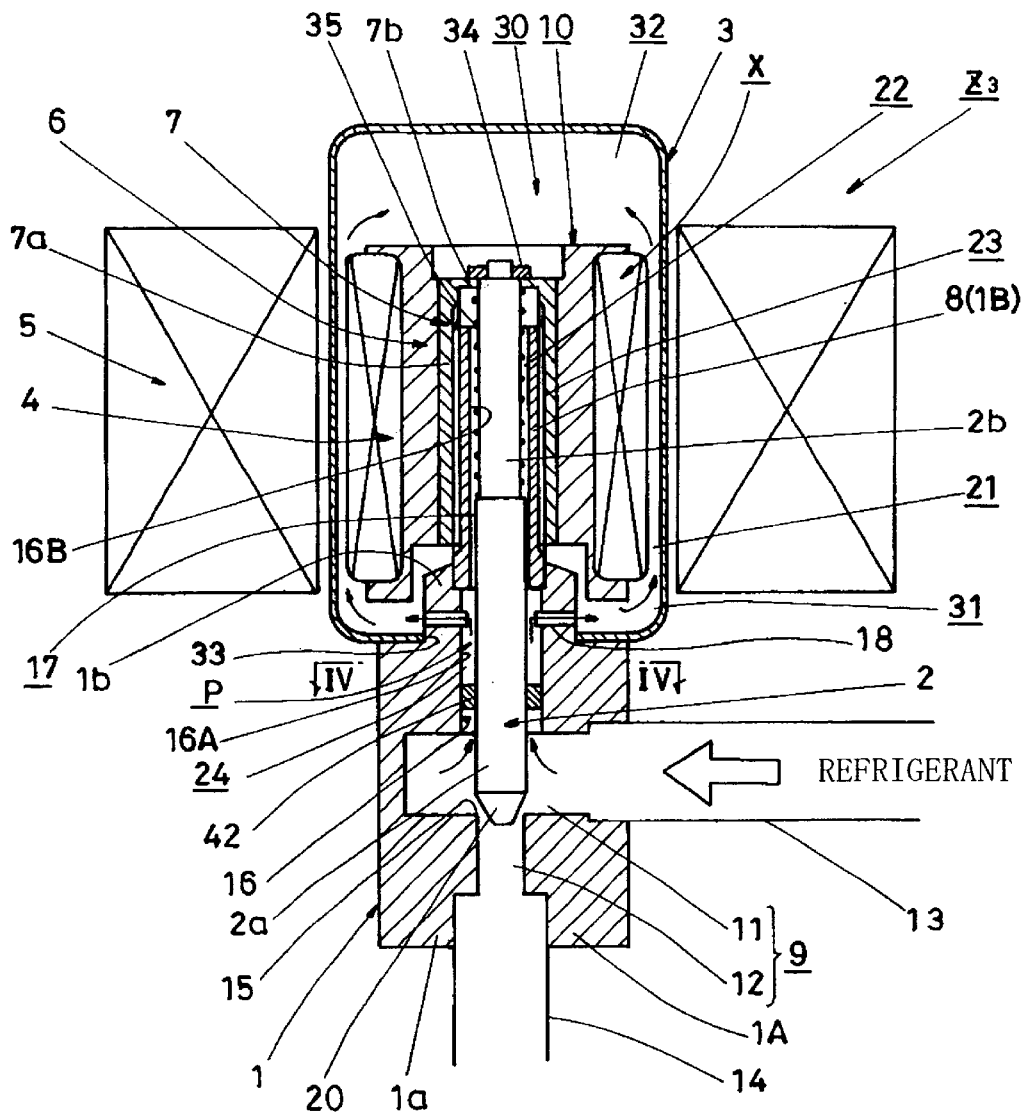
FIG. 3 is a major part cross-sectional view showing the structure of an electrically operated expansion valve as a third embodiment of the refrigerating circuit electrically operated needle valve of the present invention.
Figure 4:
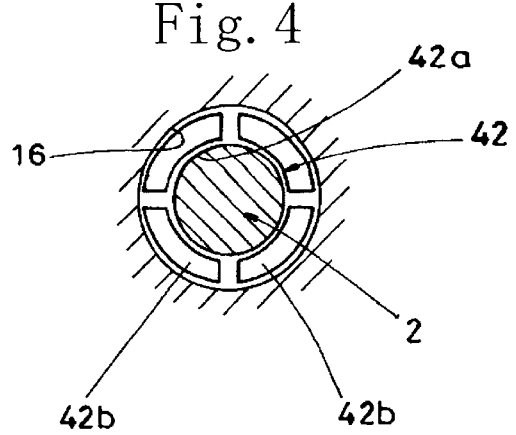
FIG. 4 is an enlarged cross-sectional view taken along IV—IV of FIG. 3.

Referring to FIG. 3, there is shown an electrically operated expansion valve $Z_3$ according to a third embodiment of the present invention. The electrically operated expansion valve $Z_3$ is an electrically operated expansion valve to which the first, third, fourth, seventh, ninth, and tenth inventions of the present application are applied. The electrically operated expansion valve $Z_3$, which is a further developed type of the electrically operated expansion valve $Z_2$ of the second embodiment, has a needle guide member 42 (which will be described below) at an area of the annular clearance 24, in addition to the same structure as the electrically operated expansion valve $Z_2$.

The needle guide member 42 has an inner periphery as a needle fit/insert aperture 42a having an inside diameter dimension capable of slidably supporting the needle 2 and, on the other hand, a plurality of refrigerant flow paths 42b, 42b, . . . are formed on the outer peripheral side of the needle fit/insert aperture 42a.

In the electrically operated expansion valve $Z_3$ including the needle guide member 42, in addition to the same operation effect that the electrically operated expansion valve $Z_2$ of the second embodiment provides, the following operation effect can be obtained. In the electrically operated expansion valve $Z_3$, the needle guide member 42 is provided and the needle 2 is slidably supported by both the needle guide member 42 and the smaller diameter aperture portion 16B on the side of the screw thread formation member 8. Such arrangement further ensures that the axial center of the needle 2 is held assuredly, and the operation reliability of the electrically operated expansion valve $Z_3$ is enhanced to a further extent.

In the electrically operated expansion valve $Z_3$ of the present embodiment, the annular clearance 24 and the pressure equalization aperture 18 together constitute a refrigerant flow amount lowering means P.

EMBODIMENT 4

Figure 5:
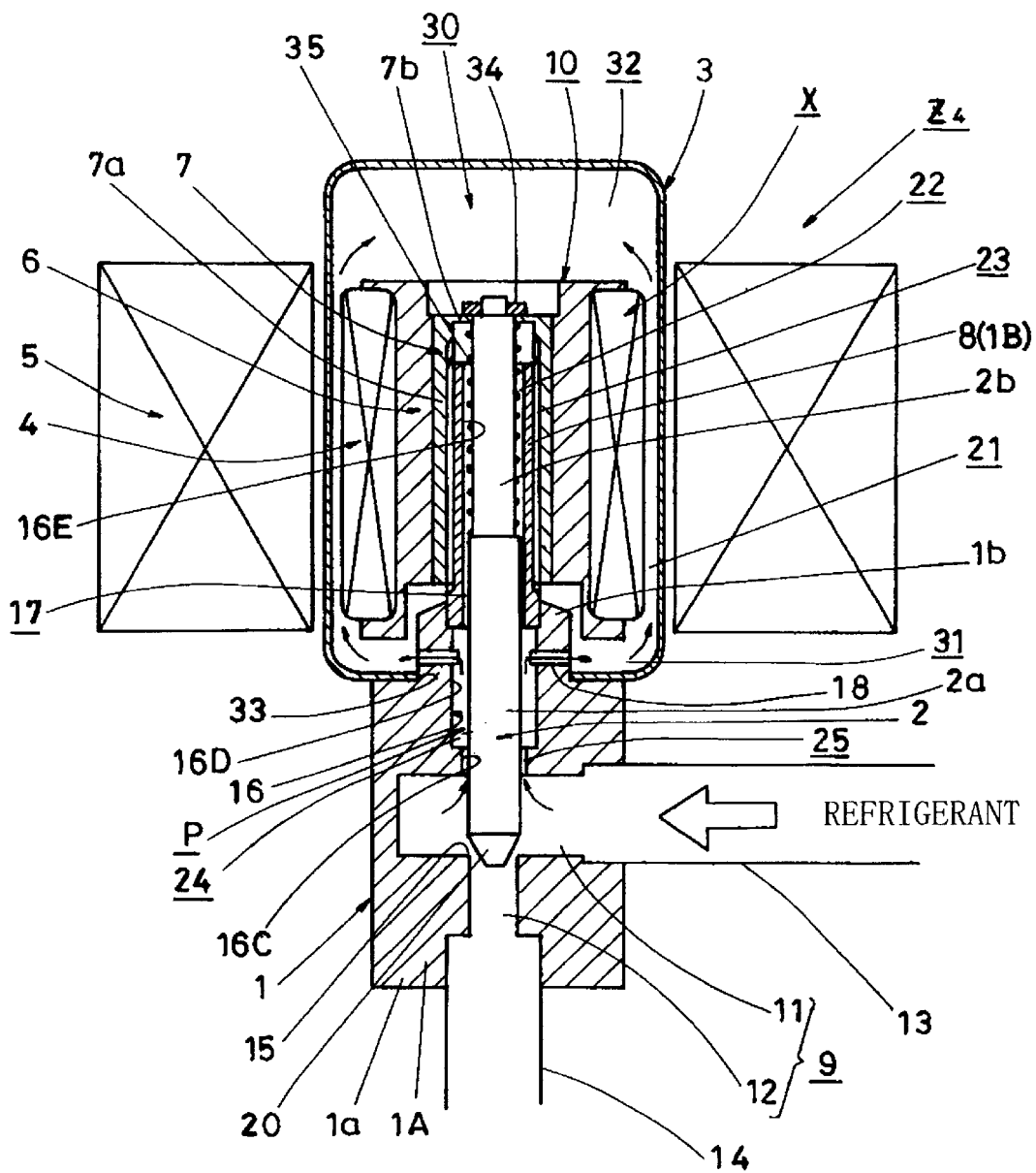
FIG. 5 is a major part cross-sectional view showing the structure of an electrically operated expansion valve as a fourth embodiment of the refrigerating circuit electrically operated needle valve of the present invention.

Referring to FIG. 5, there is shown an electrically operated expansion valve $Z_4$ according to a fourth embodiment of the present invention. The electrically operated expansion valve $Z_4$ is an electrically operated expansion valve to which the first, fifth, eighth, ninth, and tenth inventions of the present application are applied. The electrically operated expansion valve $Z_4$ is a variation of the electrically operated expansion valve $Z_3$ according to the third embodiment. The electrically operated expansion valve $Z_3$ of the third embodiment is provide with the needle guide member 42 by which the lower side of the needle 2 is supported. On the other hand, in the electrically operated expansion valve $Z_4$ of the present embodiment it is arranged such that the lower side of the needle 2 is supported on the side of the base portion 1, thereby eliminating the need for attachment of the needle guide member 42.

That is, in the electrically operated expansion valve $Z_4$, the needle fit/insert aperture 16, which is so formed as to extend from the base portion 1A to the secondary portion 1B, is composed of a first smaller diameter aperture portion 16C which is positioned nearer to the refrigerant flow path 9 and which is of slightly greater diameter dimension than that of the outside diameter of the needle 2, a larger diameter aperture portion 16D which is of greater diameter than that of the first smaller diameter aperture portion 16C, which is continuous to the first smaller diameter aperture portion 16C, and to which one end of the pressure equalization aperture 18 opens, and a second smaller diameter aperture portion 16E which is positioned on the side of the screw thread formation member 8 forming the secondary portion 1B and which has approximately the same diameter dimension as that of the first smaller diameter aperture portion 16C. Further, in such a case the axial length of the first smaller diameter aperture portion 16C is so set as to be shorter than that of the larger diameter aperture portion 16D. And, the needle 2 is supported by both the first smaller diameter aperture portion 16C and the second smaller diameter aperture portion 16B.

As a result of employing such arrangement, it is possible to obtain the same operation effect that the electrically operated expansion valve $Z_3$ of the third embodiment achieves, without the provision of the needle guide member 42 of the electrically operated expansion valve $Z_3$ of the third embodiment. In addition to this, it can be expected that the elimination of the need for the provision of the needle guide member 42 lowers manufacture costs.

That is, in the electrically operated expansion valve $Z_4$ the annular clearance 24 corresponding to the larger diameter aperture portion 16D is greater in path area and smaller in path resistance than the needle fit/insert clearance 25 formed in the first smaller diameter aperture portion 16C and the needle fit/insert clearance 17 corresponding to the second smaller diameter aperture portion 16E. Besides, because of the formation of the pressure equalization aperture 18 in an area of the annular clearance 24, the refrigerant, which flows to the larger diameter aperture portion 16D from the refrigerant flow path 9 through the smaller diameter aperture portion 16C, flows toward the internal space 30 mostly from the larger diameter aperture portion 16D of small path resistance through the pressure equalization aperture 18. Because of this, the amount of flow of a refrigerant flowing through the needle fit/insert clearance 17 is reduced relatively.

As a result, it is possible to control, as far as possible, sludge adhesion in the needle fit/insert clearance 17. Further, refrigerant flows also in the corresponding area of the needle fit/insert clearance 25 to the first smaller diameter aperture portion 16C. However, since the length of such an area is shorter than that of the larger diameter aperture portion 16D, the amount of sludge adhesion to the area is small. This introduces a synergistic effect which prevents, as far as possible, the operation of the needle 2 from being checked and, as a result, proper operation of the needle 2 is ensured.

In the electrically operated expansion valve $Z_4$ of the present embodiment, the annular clearance 24 and the pressure equalization aperture 18 together constitute a refrigerant flow amount lowering means P.

EMBODIMENTS 5 AND 6

Figure 6:
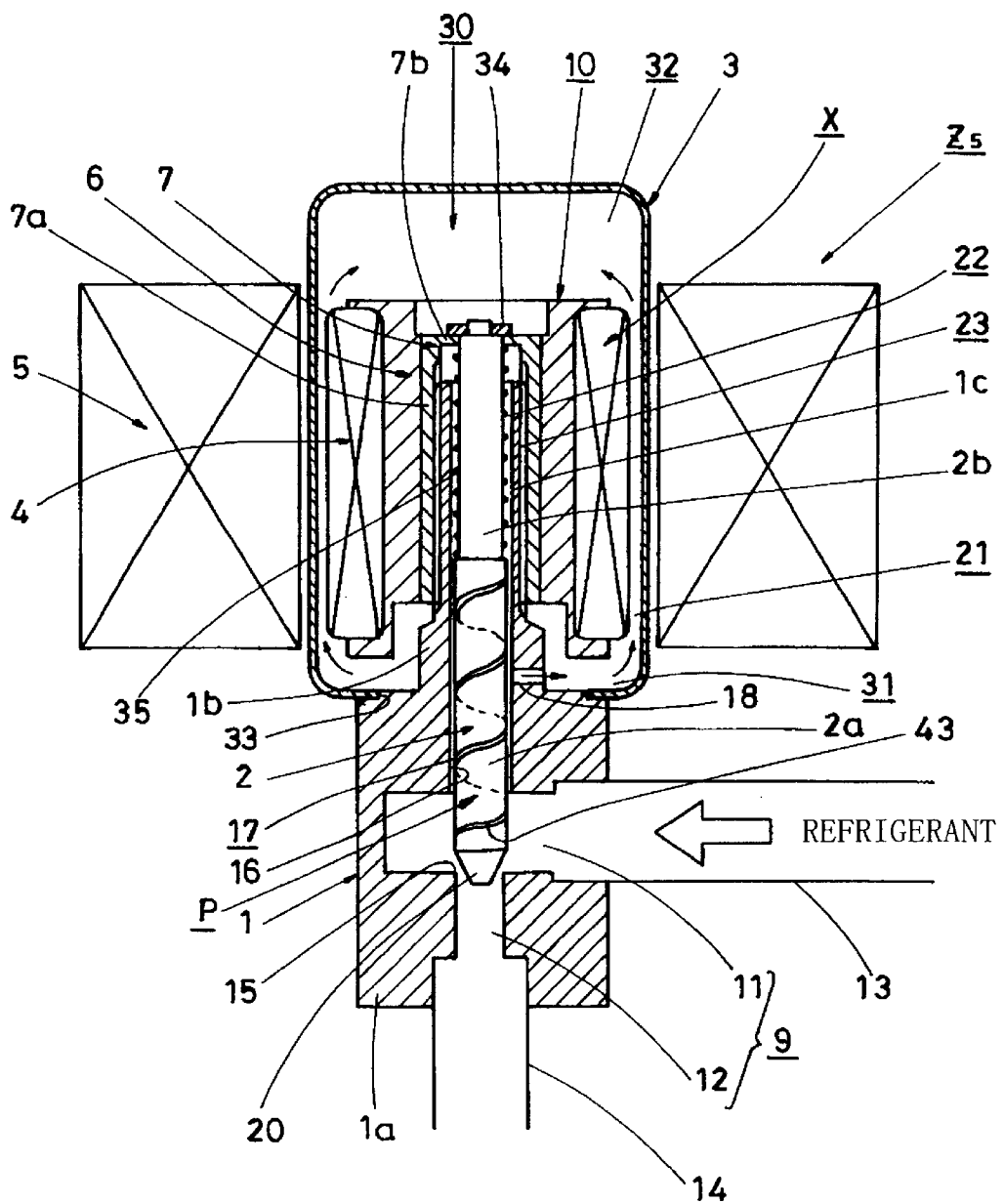
FIG. 6 is a major part cross-sectional view showing the structure of an electrically operated expansion valve as a fifth embodiment of the refrigerating circuit electrically operated needle valve of the present invention.
Figure 7:
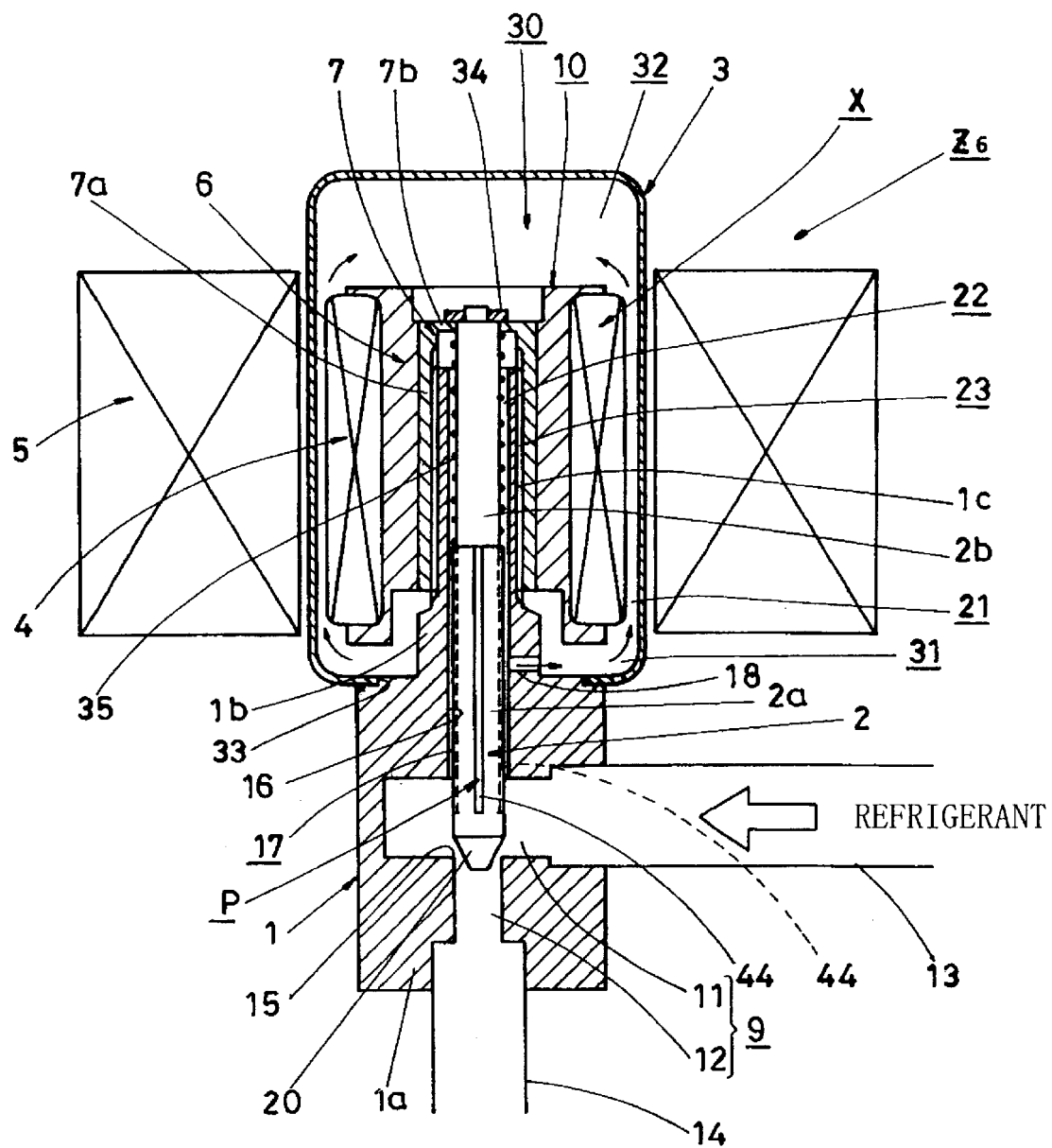
FIG. 7 is a major part cross-sectional view showing the structure of an electrically operated expansion valve as a sixth embodiment of the refrigerating circuit electrically operated needle valve of the present invention.

FIG. 6 shows an electrically operated expansion valve $Z_5$ according to a fifth embodiment of the present invention. FIG. 7 shows an electrically operated expansion valve $Z_6$ according to a sixth embodiment of the present invention. Each of these electrically operated expansion valves $Z_5$ and $Z_6$ of the fifth and sixth embodiments is an electrically operated expansion valve to which the first and sixth inventions of the present application are applied. Like the electrically operated expansion valves $Z_1$–$Z_4$ of the foregoing embodiments, the electrically operated expansion valves $Z_5$ and $Z_6$ are designed for preventing sludge adhesion in areas of the needle fit/insert clearance 17, but they differs from the electrically operated expansion valves $Z_1$–$Z_4$ in concrete structure for accomplishing such sludge adhesion prevention.

That is, the electrically operated expansion valves $Z_5$ and $Z_6$ of the fifth and sixth embodiments are based on the structure of the prior art electrically operated expansion valve $Z_0$ of FIG. 14. In addition, in the electrically operated expansion valve $Z_5$ of the fifth embodiment a spirally extending groove 43 is formed in the outer peripheral surface of the sliding shaft portion 2a of the needle 2. On the other hand, in the electrically operated expansion valve $Z_6$ of the sixth embodiment a plurality of grooves 44, 44, . . . extending in the axial direction of the needle 2 are f formed.

In accordance with these structures, refrigerant flowing between the refrigerant flow path 9 and the internal space 30 passes through the needle fit/insert clearance 17. In such a case, either the groove 43 or groove 44 is formed in the outer peripheral surface of the needle 2 facing the e needle fit/insert clearance 17, so that in the needle fit/insert clearance 17 an area facing the groove 43 or 44 is greater in path area than the other areas.

Because of this, refrigerant flowing through the needle fit/insert clearance 17 flows mostly through the area of larger path area corresponding to each groove 43 and 44, and the amount of refrigerant flow in an area other than the area corresponding to each groove 43 and 44 is relatively reduced. And, in the area corresponding to each groove 43 and 44 its path area is large and there occurs little sludge adhesion thereto. Further, also in the areas other than the area corresponding to each groove 43, and 44 the amount of refrigerant flowing therethrough is small, so that even when its clearance is narrow sludge adhesion thereto is maintained extremely small.

As a result, even when employing a refrigerant or refrigerating machine oil of high sludge yield, sludge adhesion in a narrow clearance area of the needle fit/insert clearance 17 is prevented as far as possible, thereby ensuring proper operation of the needle 2. Because of this, for example abnormal liquid compression or overheating in the compressor is forestalled, and the operation reliability of a refrigerating system having the electrically operated expansion valve $Z_5$ or $Z_6$ is enhanced.

In the electrically operated expansion valve $Z_5$ of the fifth embodiment, the groove 43 corresponds to the refrigerant flow amount lowering means P. On the other hand, in the electrically operated expansion valve $Z_6$ of the sixth embodiment, the groove 44 corresponds to the refrigerant flow amount lowering means P.

Further, the grooves 43 and 44 are not limited to the above arrangement in which they are formed in the outer peripheral surface of the needle 2 as in the fifth and sixth embodiments. For example the grooves 43 and 44 may of course be formed in the inner peripheral surface of the needle fit/insert aperture 16 of the valve main body 1 and alternatively they are formed both in the outer peripheral surface of the needle 2 and in the inner peripheral surface of the needle fit/insert aperture 16.

EMBODIMENT 7

Figure 8:
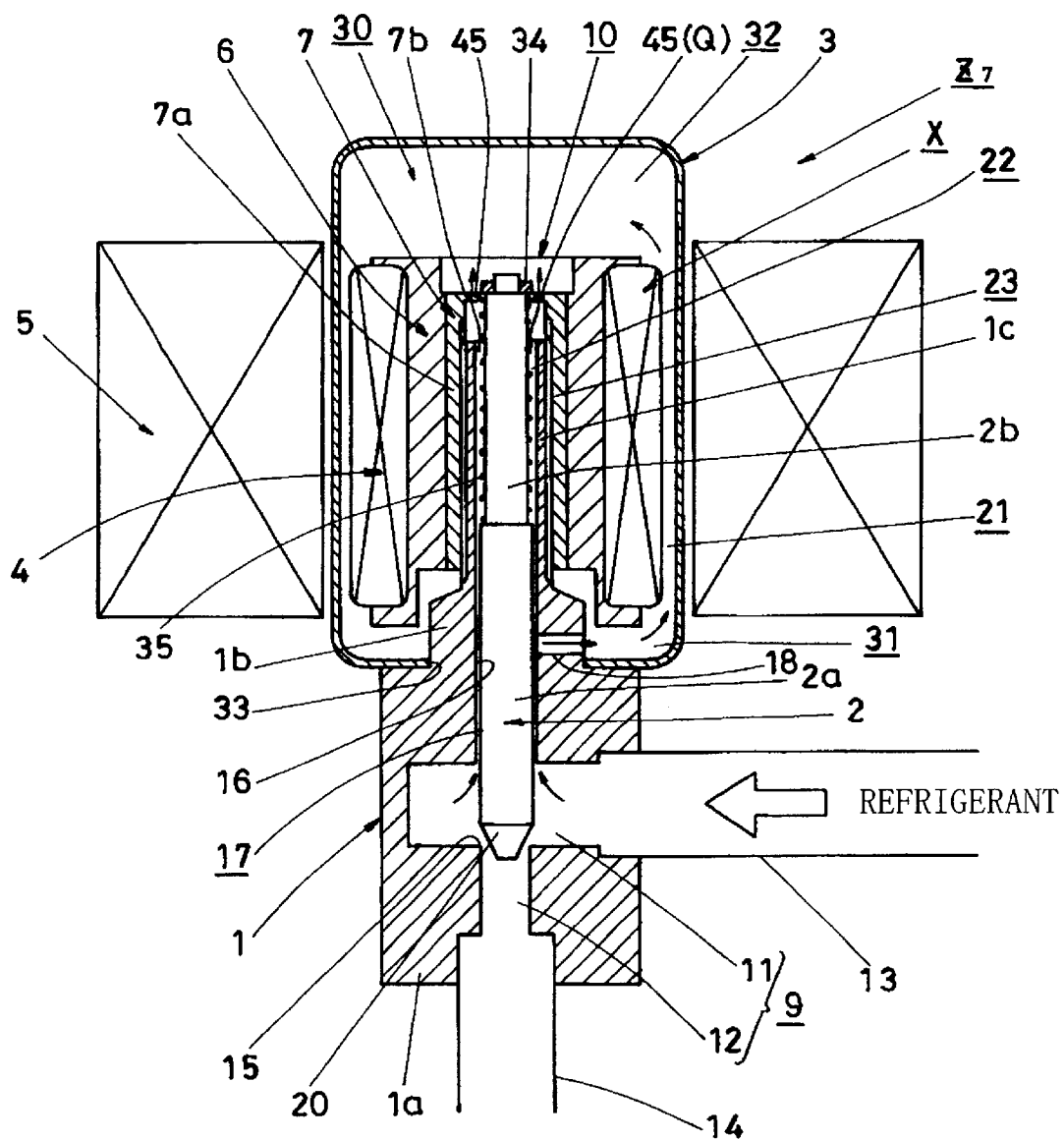
FIG. 8 is a major part cross-sectional view showing the structure of an electrically operated expansion valve as a seventh embodiment of the refrigerating circuit electrically operated needle valve of the present invention.

Referring to FIG. 8, there is shown an electrically operated expansion valve $Z_7$ according to a seventh embodiment of the present application. The electrically operated expansion valve $Z_7$ of the present embodiment is an electrically operated expansion valve to which the twelfth and thirteenth inventions of the present application are applied. The electrically operated expansion valve $Z_7$ is intended for preventing sludge adhesion in the engagement clearance 23 when refrigerant flows through the engagement clearance 23 between the screw thread formation portion 1c of the valve main body 1 and the screw thread formation member 7. To this end, the electrically operated expansion valve $Z_7$ of the present embodiment is equipped with a refrigerant flow amount lowering means Q for lowering the amount of flow of a refrigerant flowing through the engagement clearance 23.

This seventh embodiment and eighth and ninth embodiments which will be described later are embodiments specifying their respective concrete structures of the refrigerant flow amount lowering means Q.

The electrically operated expansion valve $Z_7$ of the seventh embodiment is intended for lowering the amount of a refrigerant flowing toward the engagement clearance 23 of the whole refrigerant which flows out toward the end face of the screw thread formation portion 1c of the valve main body 1 from the refrigerant flow path 9 through the needle fit/insert clearance 17. To this end, a plurality of communicating apertures 45, 45, . . . are formed in the end face portion 7b of the screw thread formation member 7 which is arranged so as to cover the end face side of the screw thread formation portion 1c of the valve main body 1.

And, refrigerant flowing into the end face portion 7b by way of the needle fit/insert clearance 17 is passed through each communicating aperture 45, 45, . . . so that the refrigerant flows out directly to the second space portion 32. The electrically operated expansion valve $Z_7$ is SO formed as to relatively lower the amount of flow of a refrigerant flowing into the engagement clearance 23 by the communicating apertures 45, 45, and so on. In the electrically operated expansion valve $Z_7$ of the present embodiment, the communicating aperture 45 corresponds to the refrigerant flow amount lowering means Q.

As described above, even when employing a refrigerant or refrigerating machine oil of high sludge yield, sludge adhesion is prevented as far as possible because in the narrow engagement clearance 23 the amount of flow of a refrigerant flowing therethrough itself is made small by lowering the amount of flow of a refrigerant passing through the engagement clearance 23. This ensures not only proper operation of the rotor portion 10 (rotational movement and axial movement) but also proper operation of the electrically operated expansion valve $Z_7$, and abnormal liquid compression or overheating in the compressor is forestalled in a refrigerating system with the electrically operated expansion valve $Z_7$. High operation reliability is obtained.

EMBODIMENTS 8 AND 9

Figure 9:
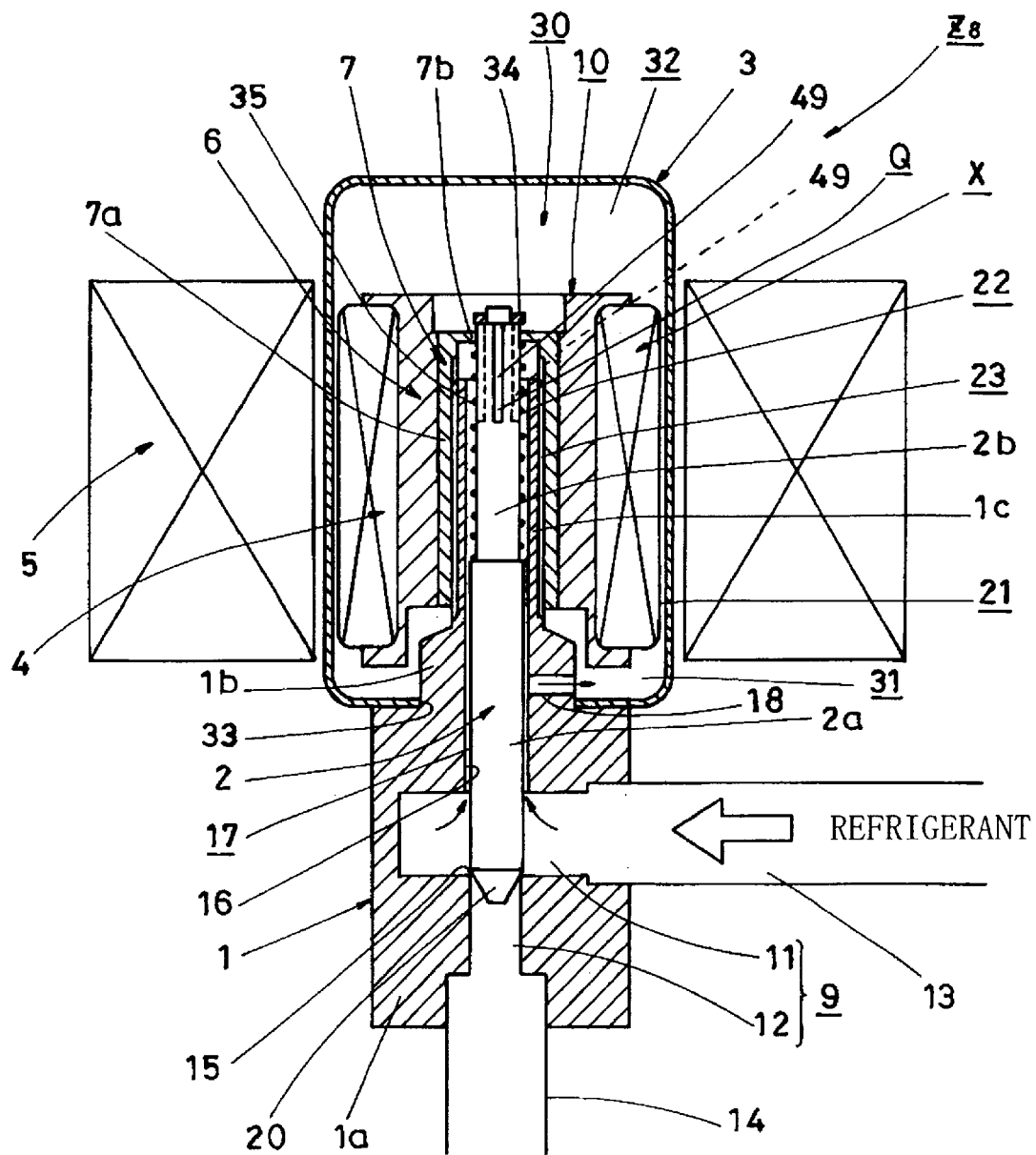
FIG. 9 is a major part cross-sectional view showing the structure of an electrically operated expansion valve as an eighth embodiment of the refrigerating circuit electrically operated needle valve of the present invention.
Figure 10:
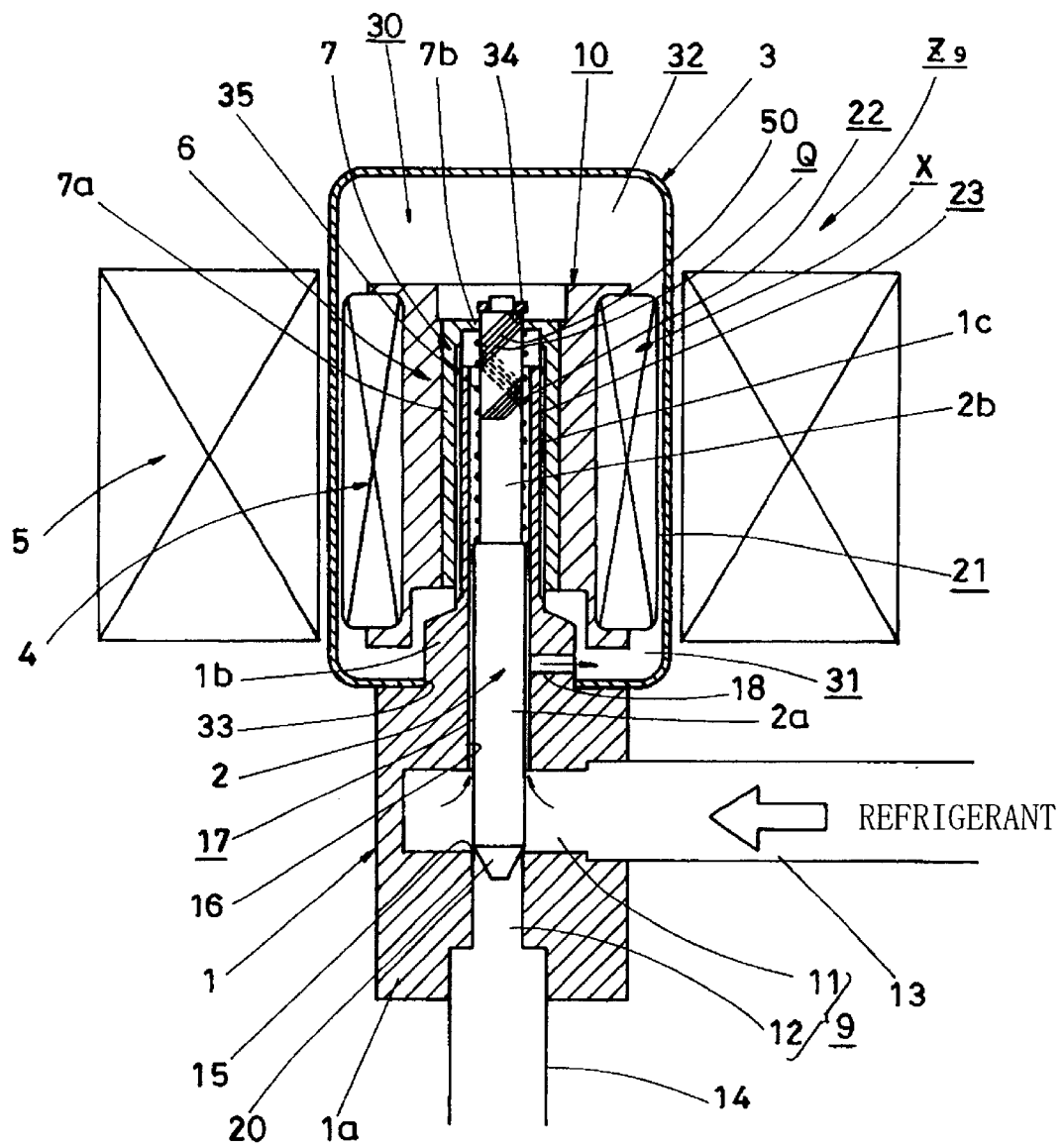
FIG. 10 is a major part cross-sectional view showing the structure of an electrically operated expansion valve as a ninth embodiment of the refrigerating circuit electrically operated needle valve of the present invention.

FIG. 9 shows an electrically operated expansion valve $Z_8$ according to an eighth embodiment of the present application. On the other hand, FIG. 10 shows an electrically operated expansion valve $Z_9$ according to a ninth embodiment of the present application. Each of the electrically operated expansion valves $Z_8$ and $Z_9$ of these embodiments is an electrically operated expansion valve to which the twelfth and fourteenth inventions of the present application are applied. Like the electrically operated expansion valves $Z_7$ of the seventh embodiment, these electrically operated expansion valves $Z_8$ and $Z_9$ are intended for preventing sludge adhesion in the engagement clearance 23, but they differs from the electrically operated expansion valve $Z_7$ in concrete structure (i.e., in structure of the refrigerant flow amount lowering means Q) for accomplishing such sludge adhesion prevention.

That is, the electrically operated expansion valves $Z_8$ and $Z_9$ of these embodiments each make utilization of a given clearance created between the fastening member 34 and the end face portion 7b of the screw thread formation member 7 when the needle 2 is in its fully closed state. More concretely, as shown in FIGS. 9 and 10, when the valve head portion 20 of the needle 2 seats against the valve seat portion 15 of the refrigerant flow path 9, further downward movement of the needle 2 is regulated.

In this state, pressing force is applied, in a specified direction in which the valve is placed in the closed state, to the needle 2, as a result of which the rotor portion 10 makes further downward movement against energizing force by the spring 35 and relatively displaces with respect to the needle 2. At that time, there is created a given clearance between the fastening member 34 formed at an end of the supporting shaft portion 2b of the needle 2 and the end face portion 7b of the screw thread formation member 7, and the end of the supporting shaft portion 2b of the needle 2 projects into the second space portion 32. By making utilization of this, a refrigerant flow path 49 (50) is formed in the outer peripheral surface of the needle 2 located nearer to the end of the supporting shaft portion 2b of the needle 2. In the electrically operated expansion valve $Z_8$ of the eighth embodiment, the refrigerant flow path 49 is composed of a plurality of longitudinal grooves. In the electrically operated expansion valve $Z_9$ of the ninth embodiment, the refrigerant flow path 50 is composed of a plurality of spiral grooves.

In such an arrangement, the upper end side of the needle fit/insert clearance 17 (i.e., the communicating side to the engagement clearance 23) is brought into direct communication with the second space portion 32 through the refrigerant flow path 49 (50) when the needle 2 is in its fully closed state. Because of this, most of the refrigerant flowing upward through the needle fit/insert clearance 17 directly flows out to the second space portion 32 by way of the refrigerant flow path 49 (50) of small path resistance. Accordingly, the amount of refrigerant flow in the engagement clearance 23 is relatively reduced.

As a result, as in the electrically operated expansion valve $Z_7$ of the seventh embodiment, even when employing a refrigerant or refrigerating machine oil of high sludge yield, sludge adhesion in the area of the narrow engagement clearance 23 is prevented as far as possible. This ensures not only proper operation of the rotor portion 10 (rotational movement and axial movement) but also proper operation of the electrically operated expansion valves $Z_8$ and $Z_9$, and in a refrigerating system with the electrically operated expansion valve $Z_8$ or $Z_9$ abnormal liquid compression or overheating in the compressor is forestalled. High operation reliability is obtained.

In the electrically operated expansion valve $Z_8$ of the eighth embodiment, the refrigerant flow path 49 corresponds to the refrigerant flow amount lowering means Q. On the other hand, in the electrically operated expansion valve $Z_9$ of the ninth embodiment the refrigerant flow path 50 corresponds to the refrigerant flow amount lowering means Q.

EMBODIMENTS 10–12

Figure 11:
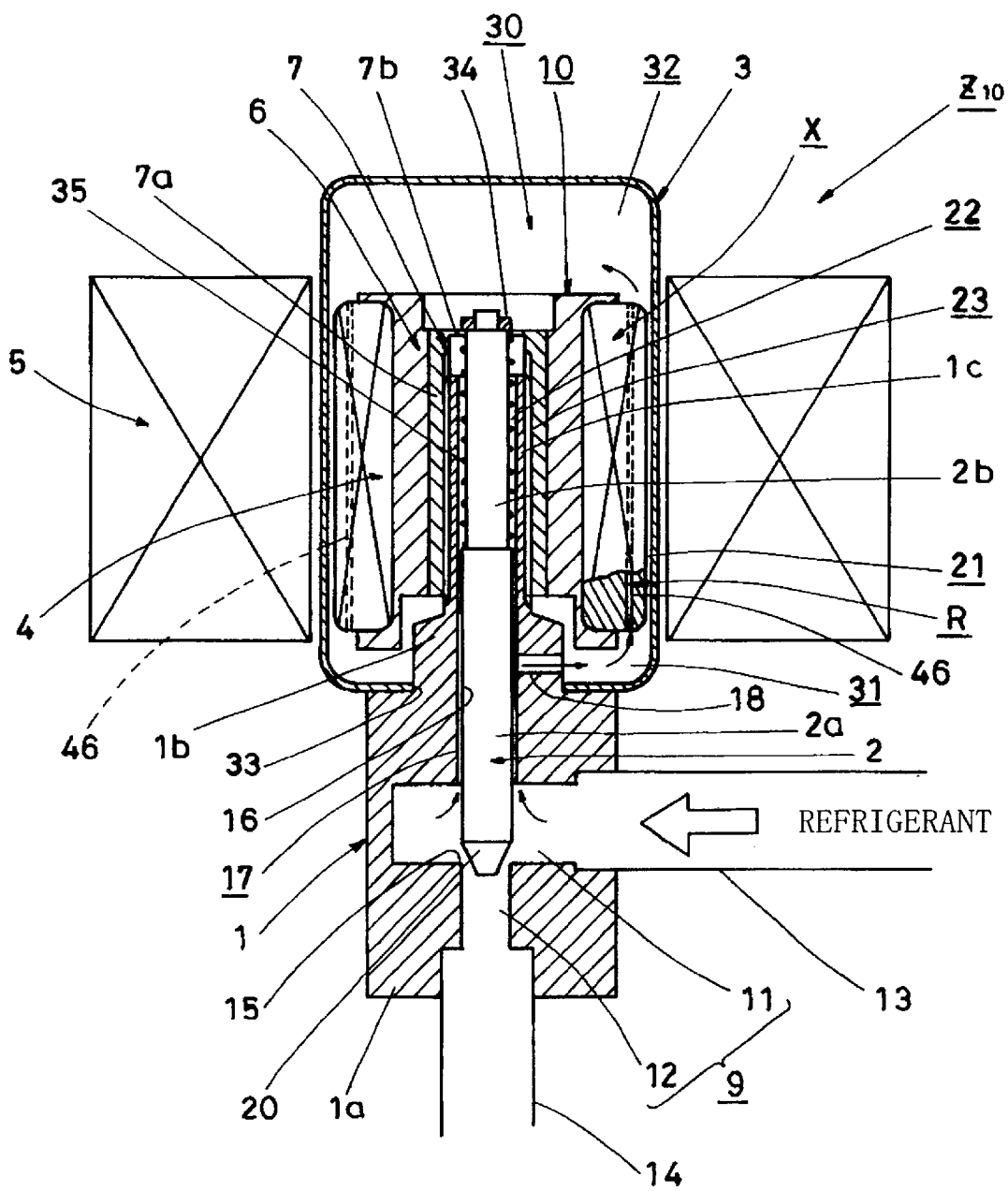
FIG. 11 is a major part cross-sectional view showing the structure of an electrically operated expansion valve as a tenth embodiment of the refrigerating circuit electrically operated needle valve of the present invention.
Figure 12:
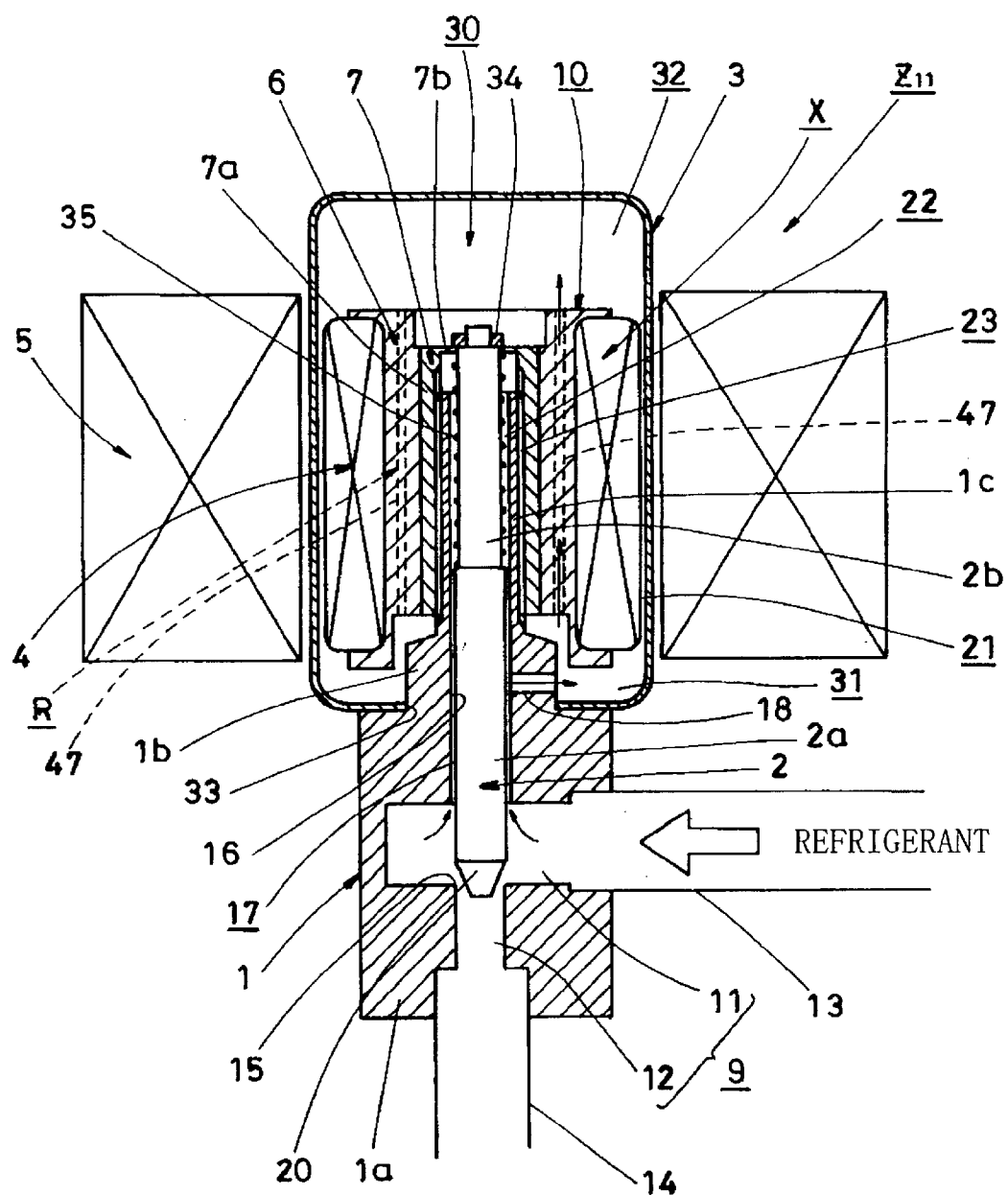
FIG. 12 is a major part cross-sectional view showing the structure of an electrically operated expansion valve as an eleventh embodiment of the refrigerating circuit electrically operated needle valve of the present invention.
Figure 13:
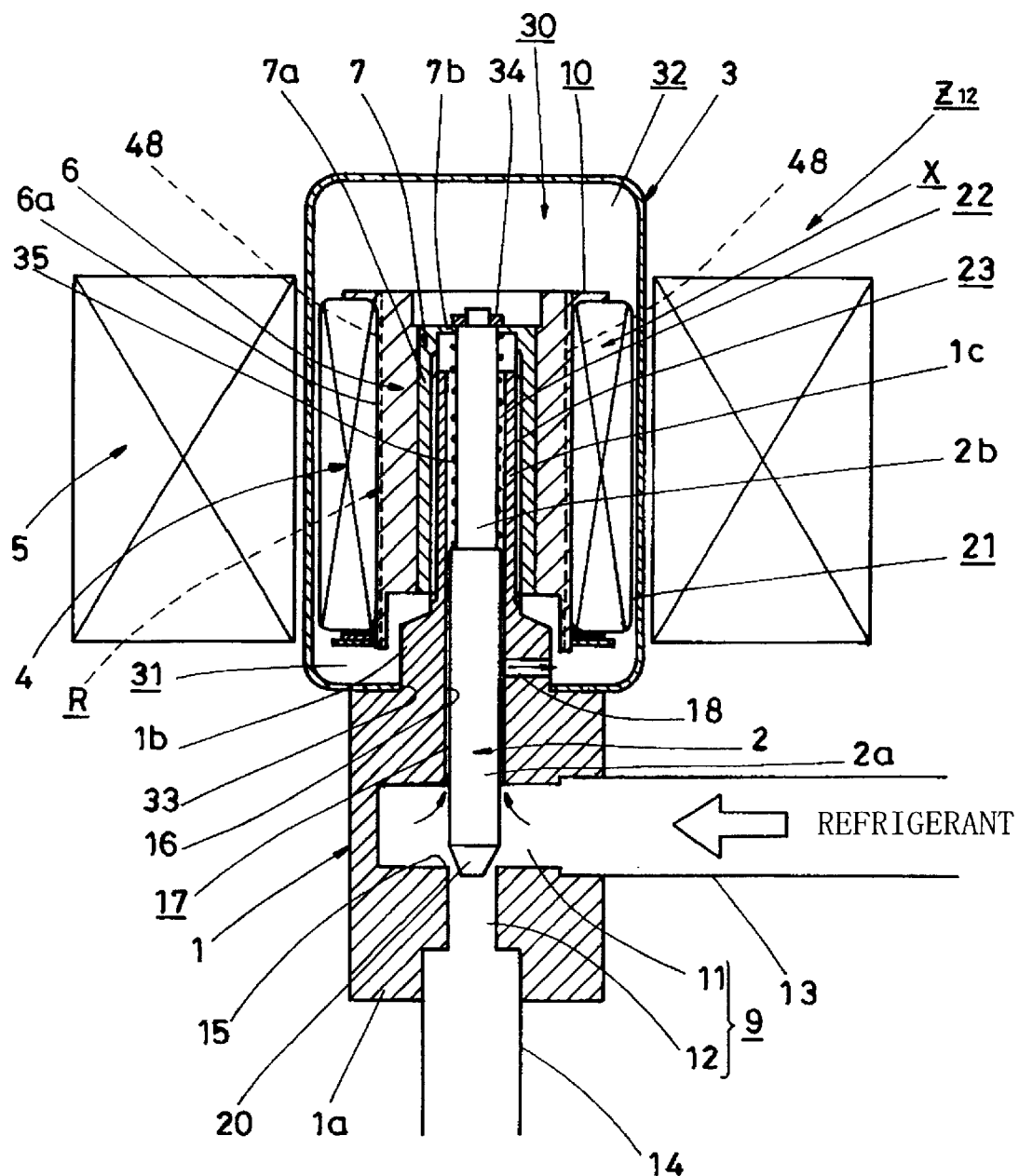
FIG. 13 is a major part cross-sectional view showing the structure of an electrically operated expansion valve as a twelfth embodiment of the refrigerating circuit electrically operated needle valve of the present invention.

FIGS. 11–13 show an electrically operated expansion valve $Z_{10}$ according to a tenth embodiment of the present application, an electrically operated expansion valve $Z_{11}$ according to an eleventh embodiment of the present application, and an electrically operated expansion valve $Z_{12}$ according to a twelfth embodiment of the present application, respectively.

Each of the electrically operated expansion valves $Z_{10}$–$Z_{12}$ of these embodiments is an electrically operated expansion valve to which the fifteenth to eighteenth inventions of the present application are applied. Each of the electrically operated expansion valves $Z_{10}$–$Z_{12}$ is intended for preventing sludge adhesion in the narrow outer peripheral clearance 21 formed between the outer peripheral wall of the casing 3 and the outer peripheral surface of the permanent magnet 4 positioned in the outermost periphery of the rotor portion 10 and placed face to face with the outer peripheral wall of the casing 3. To this end, each electrically operated expansion valve $Z_{10}$–$Z_{12}$ is provided with a refrigerant flow amount lowering means R for lowering the amount of flow of the refrigerant in the outer peripheral clearance 21.

First, in the electrically operated expansion valve $Z_{10}$ shown in FIG. 11 according to the tenth embodiment, refrigerant flow paths 46, 46, . . . are formed in areas of the peripheral wall of the permanent magnet 4, penetrating therethrough in the axial direction. The first and second space portions 31 and 32 are brought into communication with each other by each refrigerant flow path 46, 46, . . .

Further, in the electrically operated expansion valve $Z_{11}$ shown in FIG. 12 according to the eleventh embodiment, refrigerant flow paths 47, 47, . . . are formed in areas of the peripheral wall of the spacer 6 tightly clasping therein the permanent magnet 4, penetrating therethrough in the axial direction. The first and second space portions 31 and 32 are brought into communication with each other by each refrigerant flow path 47, 47, . . .

Furthermore, in the electrically operated expansion valve $Z_{12}$ shown in FIG. 13 according to the twelfth embodiment, refrigerant flow paths 48, 48, . . . are formed in areas of the abutting surface of the permanent magnet 4 and the spacer 6 tightly clasping therein the permanent magnet 4, penetrating therethrough in the axial direction. The first and second space portions 31 and 32 are brought into communication with each other by each refrigerant flow path 48, 48, . . . In this case, the refrigerant flow path 48 is not limited to one that is formed in the outer peripheral surface of the spacer 6 as in the twelfth embodiment. For example, the refrigerant flow path 48 may be formed in an inner peripheral surface area of the permanent magnet 4 or may be formed both in the permanent magnet 4 and in the spacer 6.

As a result of such arrangement, when there is a flow of refrigerant from the first space portion 31 to the second space portion 32 by a pressure differential between the refrigerant flow path 9 and the internal space 30, the path resistance between the outer peripheral clearance 21 and the refrigerant flow path (46, 47, 48) is smaller on the side of the latter (the refrigerant flow path (46, 47, 48)) than on the side of the former (the outer peripheral clearance (21)). Accordingly, most of the refrigerant flows through the refrigerant flow path (46, 47, 48), and the amount of refrigerant flowing through the outer peripheral clearance 21 is relatively reduced by an amount of refrigerant flowing through the refrigerant flow path (46, 47, 48).

As a result, because of such a relative drop in the amount of refrigerant flowing through the outer peripheral clearance 21, the amount of sludge adhesion to the wall surface of the outer peripheral clearance 21 (i.e., the amount of sludge adhesion to the inner peripheral surface of the casing 3 and to the outer peripheral surface of the permanent magnet 4) decreases by an amount corresponding to such a refrigerant flow amount drop, even when employing a refrigerant or refrigerating machine oil of high sludge yield. Accordingly, the problem that the operation of the rotor portion 10 is checked due to adhesion of sludge in the outer peripheral clearance 21 is prevented as far as possible, thereby ensuring proper operation of the needle 2. As a result, for example abnormal liquid compression or overheating in the compressor is forestalled, and the operation reliability of a refrigerating system having the electrically operated expansion valve $Z_{10}$, $Z_{11}$, or $Z_{12}$ is enhanced.

In the tenth to twelfth embodiments, the refrigerant flow paths 46, 47, and 48 each correspond to a refrigerant flow amount lowering means R.

OTHER EMBODIMENTS

The electrically operated expansion valves $Z_1$–$Z_{12}$ of the foregoing embodiments show concrete examples for individually preventing sludge adhesion in different narrow clearances where there is a fear that sludge adhesion occurs. That is, the electrically operated expansion valves $Z_1$–$Z_{12}$ of the foregoing embodiments individually prevent sludge adhesion in the needle fit/insert clearance 17, in the outer peripheral clearance 21, and in the engagement clearance 23.

However, from the viewpoint of ensuring that inconveniences due to sludge adhesion are prevented more assuredly in the entire electrically operated expansion valve, the present invention may be a complex structure of an adequate combination of the structures shown in the electrically operated expansion valves $Z_1$–$Z_{12}$ of the foregoing embodiments.

INDUSTRIAL APPLICABILITY

As described above, the present invention provides an electrically operated expansion valve for a refrigerating circuit and a refrigerating system including such an electrically operated expansion valve useful for controlling the amount of flow of a refrigerant. The present invention is particularly suitable for cases in which HFC refrigerant or the like is used.

What is claimed is:

1. An electrically operated needle valve for a refrigerating circuit, comprising a valve main body (1) having a needle fit/insert aperture (16) and a refrigerant flow path (9) to which one end of said needle fit/insert aperture (16) opens, a casing (3) attached to said valve main body (1), a needle (2), inserted in said needle fit/insert aperture (16), for adjusting the flow path area of said refrigerant flow path (9), and for zoning said refrigerant flow path (9) into a refrigerant introduction portion (11) and a refrigerant withdrawal portion (12), and electrically operated means (X) for driving said needle (2), wherein said valve main body (1) on the other side of said needle fit/insert aperture (16) is positioned in an internal space (30) of said casing (3), while at least a part of said electrically operated means (X) is housed in said internal space (30) of said casing (3); and wherein said valve main body (1) is provided with refrigerant flow amount lowering means (P) that allows a refrigerant to follow between said refrigerant introduction portion (11) of said refrigerant flow path (9) and said internal space (30) in two opposite directions without flowing through a needle fit/insert clearance (17), so as to lower the amount of flow of a refrigerant flowing into said internal space (30) from said refrigerant flow path (9) through said needle fit/insert clearance (17) formed between said needle fit/insert aperture (16) and said needle (2).

2. The refrigerating circuit electrically operated needle valve of claim 1, wherein said refrigerant flow amount lowering means (P) is a refrigerant flow path (41) which is formed in said valve main body (1) so as to establish another communication between said refrigerant flow path (9) and said internal space (30) independently of said needle fit/insert aperture (16).

3. An electrically operated needle valve for a refrigerating circuit, comprising a valve main body (1) having a needle fit/insert aperture (16) and a refrigerant flow path (9) to which one end of said needle fit/insert aperture (16) opens, a casing (3) attached to said valve main body (1), a needle (2), inserted in said needle fit/insert aperture (16), for adjusting the flow path area of said refrigerant flow path (9), and electrically operated means (X) for driving said needle (2), wherein said valve main body (1) on the other side of said needle fit/insert aperture (16) is positioned in an internal space (30) of said casing (3), while at least a part of said electrically operated means (X) is housed in said internal space (30) of said casing (3);

wherein said valve main body (1) is provided with refrigerant flow amount lowering means (P) for lowering the amount of flow of a refrigerant flowing into said internal space (30) from said refrigerant flow path (9) through a needle fit/insert clearance (17) formed between said needle fit/insert aperture (16) and said needle (2);

wherein said needle fit/insert aperture (16) comprises a larger diameter aperture portion (16A) located nearer to said refrigerant flow path (9) and a smaller diameter aperture portion (16B), located nearer to said electrically operated means (X), for movably supporting said needle (2); and wherein said refrigerant flow amount lowering means (P) comprises a pressure equalization aperture (18) which is formed in said valve main body (1) so as to establish another communication between said larger diameter aperture portion (16A) and said internal space (30) independently of said smaller diameter aperture portion (16B), and said larger diameter aperture portion (16A).

4. The refrigerating circuit electrically operated needle valve of claim 3, wherein said larger diameter aperture portion (16A) is provided with a needle guide member (42) which, while movably supporting said needle (2), allows refrigerant circulation in the axial direction of said larger diameter aperture portion (16A).

5. The refrigerating circuit electrically operated needle valve of claim 3 or claim 4, wherein said valve main body (1) comprises a base portion (1A) including said refrigerant flow path (9) and a secondary portion (1B) which is a separated portion from said base portion (1A); and wherein said larger diameter aperture portion (16A) is formed in said base portion (1A) and said smaller diameter aperture portion (16B) is formed in said secondary portion (1B).

6. An electrically operated needle valve for a refrigerating circuit, comprising, a valve main body (1) having a needle fit/insert aperture (16) and a refrigerant flow path (9) to which one end of said needle fit/insert aperture (16) opens, a casing (3) attached to said valve main body (1), a needle (2), inserted in said needle fit/insert aperture (16), for adjusting the flow path area of said refrigerant flow path (9), and electrically operated means (X) for driving said needle (2), wherein said valve main body (1) on the other side of said needle fit/insert aperture (16) is positioned in an internal space (30) of said casing (3), while at least a part of said electrically operated means (X) is housed in said internal space (30) of said casing (3);

wherein said valve main body (1) is provided with refrigerant flow amount lowering means (P) for lowering the amount of flow of a refrigerant flowing into said internal space (30) from said refrigerant flow path (9) through a needle fit/insert clearance (17) formed between said needle fit/insert aperture (16) and said needle (2);

wherein said needle fit/insert aperture (16) comprises a first smaller diameter aperture portion (16C) located nearer to said refrigerant flow path (9), a second smaller diameter aperture portion (16E) located nearer to said electrically operated means (X), and a larger diameter aperture portion (16D) located between said first smaller diameter aperture portion (16C) and said second smaller diameter aperture portion (16E) and having a diameter greater than that of said first smaller diameter aperture portion (16C) and an axial length longer than that of said first smaller diameter aperture portion (16C);

wherein said needle fit/insert aperture (16) is formed so as to movably support said needle (2) either by said second smaller diameter aperture portion (16E) or by both of said first smaller diameter aperture portion (16C) and said second smaller diameter aperture portion (16E); and wherein said refrigerant flow amount lowering means (P) comprises a pressure equalization aperture (18) which is formed in said valve main body (1) so as to establish another communication between said larger diameter aperture portion (16D) and said internal space (30) independently of said second smaller diameter aperture portion (16E), and said larger diameter aperture portion (16D).

7. The refrigerating circuit electrically operated needle valve of claim 6, wherein said valve main body (1) comprises a base portion (1A) including said refrigerant flow path (9) and a secondary portion (1B) which is a separated portion from said base portion (1A); and wherein said first smaller diameter aperture portion (16C) and said larger diameter aperture portion (16D) are formed in said base portion (1A) and said second smaller diameter aperture portion (16E) is formed in said secondary portion (1B).

8. The refrigerating circuit electrically operated needle valve of any one of claims 3–6, wherein said pressure equalization aperture (18) is a round aperture and has an inside diameter of not less than 1.2 mm.

9. The refrigerating circuit electrically operated needle valve of claim 8, wherein a plurality of said pressure equalization apertures (18) are formed around said needle fit/insert aperture (16).

10. An electrically operated needle valve for a refrigerating circuit, comprising a valve main body (1) having a needle fit/insert aperture (16) and a refrigerant flow path (9) to which one end of said needle fit/insert aperture (16) opens, a casing (3) attached to said valve main body (1), a needle (2), inserted in said needle fit/insert aperture (16), for adjusting the flow path area of said refrigerant flow path (9), and electrically operated means (X) for driving said needle (2), wherein said valve main body (1) on the other side of said needle fit/insert aperture (16) is positioned in an internal space (30) of said casing (3), while at least a part of said electrically operated means (X) is housed in said internal space (30) of said casing (3);

wherein said valve main body (1) is provided with refrigerant flow amount lowering means (P) for lowering the amount of flow of a refrigerant flowing into said internal space (30) from said refrigerant flow path (9) through a needle fit/insert clearance (17) formed between said needle fit/insert aperture (16) and said needle (2);

wherein said refrigerant flow amount lowering means (P) comprises a groove (43, 44) formed either in the outer peripheral surface of said needle (2) or in the inner peripheral surface of said needle fit/insert aperture (16).

11. The refrigerating circuit electrically operated needle valve of any one of claims 1–10, wherein the clearance distance of said needle fit/insert clearance (17) is so set as to be not less than 0.2 mm.

12. An electrically operated needle valve for a refrigerating circuit, comprising a valve main body (1) having a needle fit/insert aperture (16) and a refrigerant flow path (9) to which one end of said needle fit/insert aperture (16) opens, a casing (3) attached to said valve main body (1), a needle (2), inserted in said needle fit/insert aperture (16), for adjusting the flow path area of said refrigerant flow path (9), and electrically operated means (X) for driving said needle (2), wherein said valve main body (1) on the other side of said needle fit/insert aperture (16) is positioned in an internal space (30) of said casing (3), while at least a part of said electrically operated means (X) is housed in said internal space (30) of said casing (3);

wherein said electrically operated means (X) is provided with a screw thread portion which engages with said valve main body (1) outside said needle fit/insert aperture (16) and extends in the axial direction of said needle fit/insert aperture (16);

wherein an engagement clearance (23) between said screw thread portion of said electrically operated means (X) and said valve main body (1) communicates with one end of said needle fit/insert aperture (16); and wherein refrigerant flow amount lowering means (Q) for lowering the amount of flow of a refrigerant flowing into said engagement clearance (23) from said refrigerant flow path (9) through said needle fit/insert aperture (16) is provided.

13. The refrigerating circuit electrically operated needle valve of claim 12, wherein said refrigerant flow amount lowering means (Q) is a communicating aperture (45) which is formed face to face with the other end of said needle fit/insert aperture (16) in said electrically operated means (X).

14. The refrigerating circuit electrically operated needle valve of claim 12, wherein said refrigerant flow amount lowering means (Q) is a refrigerant flow path (49, 50), formed in an end of said needle (2), for bringing said needle fit/insert aperture (16) and said internal space (30) into communication with each other when said needle (2) makes, in its axial direction, a relative displacement with respect to said electrically operated means (X).

15. An electrically operated needle valve for a refrigerating circuit, comprising a valve main body (1) having a needle fit/insert aperture (16) and a refrigerant flow path (9) to which one end of said needle fit/insert aperture (16) opens, a casing (3) attached to said valve main body (1), a needle (2), inserted in said needle fit/insert aperture (16), for adjusting the flow path area of said refrigerant flow path (9), and electrically operated means (X) for driving said needle (2), wherein said valve main body (1) on the other side of said needle fit/insert aperture (16) is positioned in an internal space (30) of said casing (3), while at least a part of said electrically operated means (X) is housed in said internal space (30) of said casing (3);

wherein an outer peripheral clearance (21) is formed between the outer peripheral surface of said electrically operated means (X) and the inner peripheral surface of said casing (3); and wherein refrigerant flow amount lowering means (R) for lowering the amount of flow of a refrigerant flowing between a first space portion (31) of said internal space (30) located on one side of said electrically operated means (X) and a second space portion (32) of said internal space (30) located on the other side of said electrically operated means (X) through said outer peripheral clearance (21).

16. The refrigerating circuit electrically operated needle valve of claim 15, wherein said refrigerant flow amount lowering means (R) is a refrigerant flow path (46) formed in a peripheral wall area of a permanent magnet (4) of said electrically operated means (1).

17. The refrigerating circuit electrically operated needle valve of claim 15, wherein said refrigerant flow amount lowering means (R) is a refrigerant flow path (47) formed in a peripheral wall area of a spacer (6), located on the inner peripheral side of a permanent magnet (4) of said electrically operated means (X), for holding said permanent magnet (4).

18. The refrigerating circuit electrically operated needle valve of claim 15, wherein said refrigerant flow amount lowering means (R) is a refrigerant flow path (48) formed between a permanent magnet (4) of said electrically operated means (X) and a spacer (6), located on the inner peripheral side of said permanent magnet (4), for holding said permanent magnet (4).

19. A refrigerating system employing a refrigerating circuit electrically operated needle valve of any one of claims 1, 12 and 15 as an expansion valve.

20. The refrigerating system of claim 19, wherein an HFC refrigerant or mixed refrigerant containing HFC, both of said refrigerants being of higher theoretical discharge temperature than that of R32, is used as said refrigerant.

21. The refrigerating system of claim 19, wherein an HFC refrigerant or mixed refrigerant containing HFC, both of said refrigerants being of higher theoretical discharge temperature than that of R12 and R502, is used as said refrigerant.

22. The refrigerating system of claim 19, wherein a single refrigerant of R32 or mixed refrigerant containing R32 is used as said refrigerant.

23. The refrigerating system of claim 19, wherein a synthetic oil is used as a refrigerating machine oil.

24. The refrigerating system of claim 22, wherein polyol ester, carbonic ester, polyvinyl ether, alkyne benzene, or polyalkylene glycol is used as a base oil of said synthetic oil.

25. The refrigerating system of claim 20 or claim 18, wherein a synthetic oil containing an extreme pressure additive is used as a refrigerating machine oil.

26. The refrigerating system of claim 19, wherein a plurality of utilization-side heat exchangers or heat source-side heat exchangers are provided.

* * * * *

UNITED STATES PATENT AND TRADEMARK OFFICE
CERTIFICATE OF CORRECTION

PATENT NO. : 6,701,744 B1
DATED : March 9, 2004
INVENTOR(S) : Ryuzaburo Yajima et al.

It is certified that error appears in the above-identified patent and that said Letters Patent is hereby corrected as shown below:

Title page,
Item [54], Title, delete "MOTOR-DRIVEN NEEDLE VALVE FOR REFRIGERATION CIRCUIT AND REFRIGERATION DEVICE WITH THE MOTOR-DRIVEN NEEDLE VALVE" and add -- ELECTRICALLY OPERATED NEEDLE VALVE FOR A REFRIGERATING CIRCUIT AND REFRIGERATING SYSTEM WITH SUCH A VALVE --
Item [75], Inventors, delete "Sakai" and "Kusato" each time it occurs and add -- Osaka --

Column 32,
Line 36, change "18" to -- 21 --.

Signed and Sealed this

Thirty-first Day of August, 2004

JON W. DUDAS
*Director of the United States Patent and Trademark Office*